United States Patent
Rajpoot et al.

(10) Patent No.: US 12,170,905 B2
(45) Date of Patent: Dec. 17, 2024

(54) METHOD, APPARATUS, AND COMPUTER READABLE MEDIUM

(71) Applicant: RAKUTEN SYMPHONY, INC., Tokyo (JP)

(72) Inventors: Atul Singh Rajpoot, Madhya Pradesh (IN); Sudeep Kumar Jain, Madhya Pradesh (IN); Durgesh Rathore, Madhya Pradesh (IN); Keshav Sharma, Madhya Pradesh (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 337 days.

(21) Appl. No.: 17/710,930

(22) Filed: Mar. 31, 2022

(65) Prior Publication Data

US 2023/0319590 A1   Oct. 5, 2023

(51) Int. Cl.
*H04W 16/28* (2009.01)
*H04B 17/318* (2015.01)

(52) U.S. Cl.
CPC .......... *H04W 16/28* (2013.01); *H04B 17/318* (2015.01)

(58) Field of Classification Search
CPC ........ G02B 2027/0178; G02B 27/0093; G02B 27/0172; G02B 27/283; G02B 27/286; G02B 6/0035; G02B 6/005; G02B 227/0093

See application file for complete search history.

(56) References Cited

U.S. PATENT DOCUMENTS

| | | | |
|---|---|---|---|
| 2015/0357708 A1* | 12/2015 | Au | H01Q 1/246 343/766 |
| 2016/0212023 A1* | 7/2016 | Mohan | H04L 43/045 |
| 2021/0356493 A1* | 11/2021 | Mueggenborg | G01P 15/18 |

* cited by examiner

*Primary Examiner* — Mansour Oveissi
*Assistant Examiner* — David Oveissi
(74) *Attorney, Agent, or Firm* — HAUPTMAN HAM, LLP

(57) ABSTRACT

A method for disoriented cell configuration includes collecting user data of a first set of cells, determining a disoriented cell of the first set of cells based on the user data, and changing a configuration of an antenna of the disoriented cell. Changing the configuration of the antenna of the disoriented cell includes changing the deployed azimuth of the antenna to be equal to the planned azimuth of the antenna. The user data includes received signal strength of a first set of users, geolocation data of the first set of users, or a cell identifier of a corresponding cell of the first set of cells. The disoriented cell of the first set of cells includes a node with an antenna with a deployed azimuth. The disoriented cell of the first set of cells corresponds to a filtered first set of qualified geolocation data of a filtered second set of users.

20 Claims, 17 Drawing Sheets

| | Column 1 | Column 2 | Column 3 | Column 4 | Column 5 | Column 6 |
|---|---|---|---|---|---|---|
| | Cell ID | Cell name | Cell Location | Planned Azimuth | Deployed Azimuth | Cell status |
| Row 1 | | | | | | |
| Row 2 | 1 | J1 | Tokyo-A | 25 | 25 | Normal |
| Row 3 | 2 | J2 | Tokyo-B | 35 | 155 | Disoriented |
| Row 4 | 3 | J3 | Tokyo-C | 45 | 45 | Normal |
| Row 5 | 4 | J4 | Tokyo-D | 65 | 315 | Disoriented |
| Row 6 | 5 | J5 | Tokyo-E | 180 | 270 | Disoriented |

METHOD, APPARATUS, AND COMPUTER READABLE MEDIUM

FIELD

The present application relates to a method for disoriented cell configuration, and an apparatus for disoriented cell configuration.

BACKGROUND

Network service providers and device manufacturers (e.g., wireless, cellular, etc.) are continually challenged to deliver value and convenience to consumers by, for example, providing compelling network services that are capable of being flexibly constructed, scalable and diverse.

SUMMARY

An aspect of this description relates to a method for disoriented cell configuration. In some embodiments, the method includes collecting, by a first server, user data of a first set of cells over a first duration of time, wherein the user data includes at least one of received signal strength of a first set of users, geolocation data of the first set of users, or a cell identifier of a corresponding cell of the first set of cells configured to serve the first set of users. In some embodiments, the method further includes determining, by the first server, a disoriented cell of the first set of cells based on the user data, wherein the disoriented cell of the first set of cells includes a node with an antenna with a deployed azimuth different from a planned azimuth, and the disoriented cell of the first set of cells corresponds to a filtered first set of qualified geolocation data of a filtered second set of users. In some embodiments, the method further includes changing a configuration of the antenna of the disoriented cell, wherein changing the configuration of the antenna of the disoriented cell includes changing the deployed azimuth of the antenna to be equal to the planned azimuth of the antenna.

An aspect of this description relates to an apparatus for disoriented cell configuration. In some embodiments, the system includes a memory having non-transitory instructions stored, and a processor coupled to the memory, and being configured to execute the instructions, thereby causing the apparatus to collect user data of a first set of cells over a first duration of time, wherein the user data includes at least one of received signal strength of a first set of users, geolocation data of the first set of users, or a cell identifier of a corresponding cell of the first set of cells configured to serve the first set of users; determine a disoriented cell of the first set of cells based on the user data, wherein the disoriented cell of the first set of cells includes a node with an antenna with a deployed azimuth different from a planned azimuth, and the disoriented cell of the first set of cells corresponds to a filtered first set of qualified geolocation data of a filtered second set of users; and change a configuration of the antenna of the disoriented cell, wherein the non-transitory instructions that cause the apparatus to change the configuration of the antenna of the disoriented cell, the processor being further configured to cause the apparatus to: change the deployed azimuth of the antenna to be equal to the planned azimuth of the antenna.

An aspect of this description relates to a computer-readable medium. In some embodiments, the computer-readable medium includes instructions executable by a controller of a first server to cause the controller to perform operations including collecting user data of a first set of cells over a first duration of time, wherein the user data includes at least one of received signal strength of a first set of users, geolocation data of the first set of users, or a cell identifier of a corresponding cell of the first set of cells configured to serve the first set of users. In some embodiments, the computer-readable medium includes instructions to cause the controller to perform operations further including determining a disoriented cell of the first set of cells based on the user data, wherein the disoriented cell of the first set of cells includes a node with an antenna with a deployed azimuth different from a planned azimuth, and the disoriented cell of the first set of cells corresponds to a filtered first set of qualified geolocation data of a filtered second set of users. In some embodiments, the computer-readable medium includes instructions to cause the controller to perform operations further including changing a configuration of the antenna of the disoriented cell. In some embodiments, changing the configuration of the antenna of the disoriented cell includes changing the deployed azimuth of the antenna to be equal to the planned azimuth of the antenna.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a diagram of a disoriented cell report, in accordance with some embodiments.

DETAILED DESCRIPTION

Figure 1:
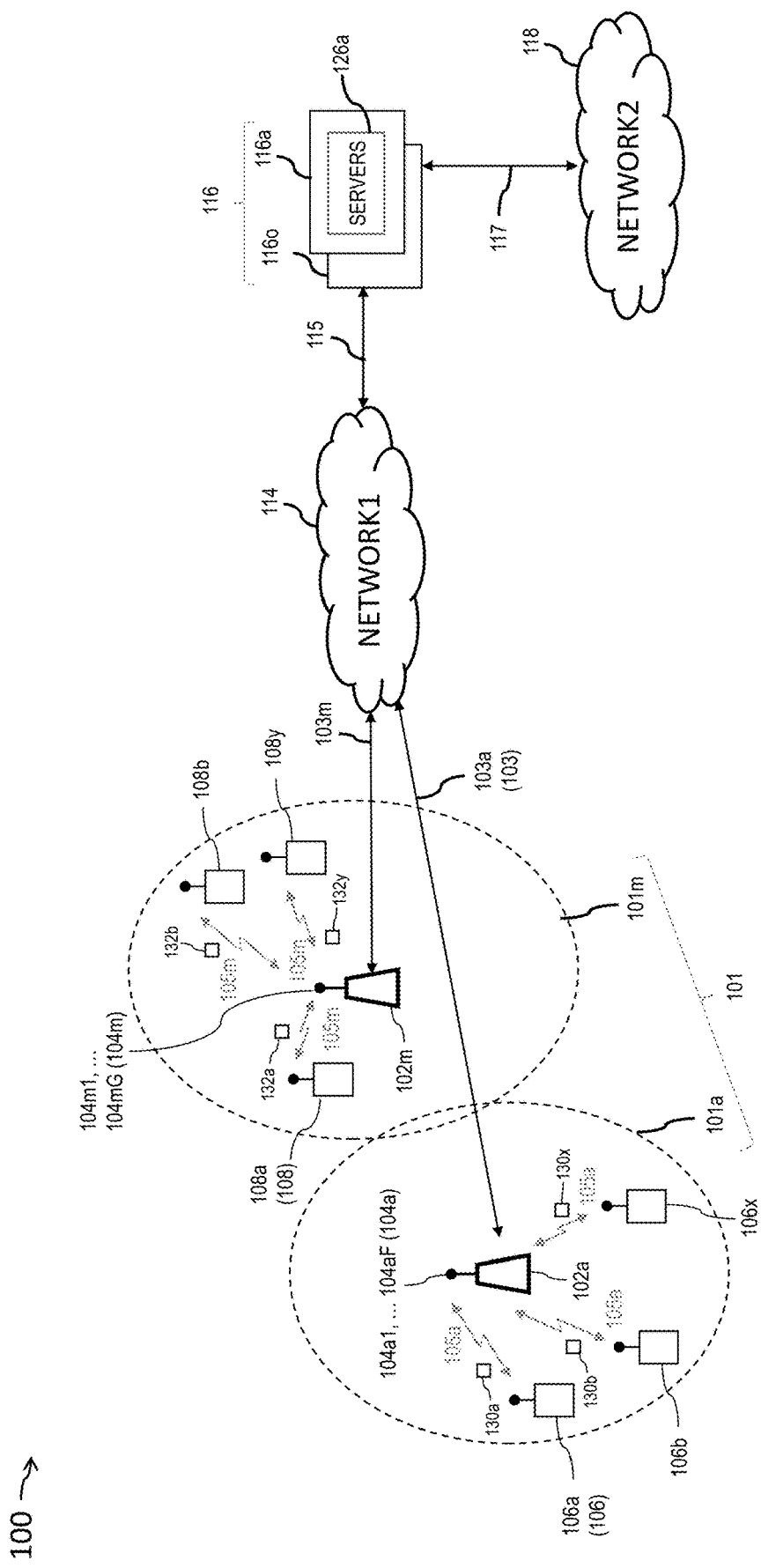
FIG. 1 is a block diagram of a communication system, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Network services are often provided by static or inflexible systems that are difficult to configure, scale, and deploy over various areas. Network service providers are challenged to provide network systems and/or network services that are capable of being flexibly constructed, scalable and diverse.

Some network systems use antennas that have a number of antenna parameters. Antenna parameters are periodically changed due to RF optimization, network upgrades, customer resolutions, etc. Some antenna parameters are changed by human personnel during field visits. An azimuth is an antenna parameter that directly affects the footprint of the radio frequency (RF) coverage. In some approaches, antennas that are not installed according to design will negatively affect the RF coverage provided by the antenna, thereby reducing the system efficiency of the network system, and increasing network operating cost.

FIG. 1 is a block diagram of a communication system 100 (hereinafter referred to as "system 100"), in accordance with some embodiments.

System 100 includes a set of cells 101 configured to transmit/receive a set of data 130 or 132 with a corresponding set of devices 106 or 108. System 100 further includes a set of nodes 102 coupled to a network 114 by a set of links 103, and the network 114 is further coupled to a set of devices 116 by a link 115. System 100 further includes a network 118 coupled to the set of devices 116 by a link 117. The set of devices 116 and the set of nodes 102 are coupled to each other by network 114. The set of devices 116 and the set of nodes 102 are configured to transfer data with each other by network 114.

The set of cells 101 corresponds to a cellular network. The set of cells 101 includes at least cell 101a, 101b, ..., 101l or 101m, where m is an integer corresponding to a number of cells in the set of cells 101. Each cell 101a, 101b, ..., 101l or 101m of the set of cells 101 includes a corresponding node 102a, 102b, ..., 102l or 102m of a set of nodes 102.

Each cell 101a, 101b, ..., 101l or 101m of the set of cells 101 further includes a corresponding set of devices 106 or 108. For ease of illustration, FIG. 1 shows two cells (e.g., cells 101a and 101m), and cell 101a or 101m includes a corresponding set of devices 106 and 108. However, each cell 101b, ..., 101l in the set of cells 101 includes a corresponding set of devices that are similar to the set of devices 106 or 108, and similar detailed description is omitted.

In some embodiments, at least one cell of the set of cells 101 corresponds to a macrocell, a microcell, a picocell, a femtocell, a small cell, or the like.

Other configurations, different types of cells or other number of cells in the set of cells 101 are within the scope of the present disclosure.

The set of nodes 102 includes at least node 102a, 102b, ..., 102l or 102m. Each node 102a, 102b, ..., 102l or 102m of the set of nodes 102 is located in a corresponding cell 101a, 101b, ..., 101l or 101m of the set of cells 101.

Each node 102a, 102b, ..., 102l or 102m of the set of nodes 102 is coupled to network 114 by a corresponding link 103a, 103b, ..., 103l or 103m of the set of links 103.

Each node 102a, 102b, ..., 102l or 102m of the set of nodes 102 includes a corresponding set of antennas 104a, 104b, ..., 104l or 104m.

Each corresponding node 102a, 102b, ..., 102l or 102m of the set of nodes 102 is configured to transmit/receive data with a corresponding set of users (e.g., set of devices 106, 108, etc.) by each corresponding set of antennas 104a, 104b, ..., 104l or 104m and each corresponding link 105a, 105b, ..., 105l or 105m of a set of links 105.

In some embodiments, at least one node of the set of nodes 102 corresponds to a base transceiver station (BTS), a NodeB, an Evolved NodeB (eNB), a Next Generation NodeB (gNB), or the like.

Other configurations, different types of nodes or other number of nodes in the set of nodes 102 are within the scope of the present disclosure. For example, in some embodiments, other number of nodes are located within at least one or more cells of the set of cells 101.

The set of links 103 includes at least one of link 103a, 103b, ..., 103l or 103m. In some embodiments, at least the set of links 103 is a wired link. In some embodiments, at least the set of links 103 is a wireless link. In some embodiments, at least the set of links 103 corresponds to any transmission medium type; e.g. fiber optic cabling, any wired cabling, and any wireless link type(s). In some embodiments, at least the set of links 103 corresponds to shielded, twisted-pair cabling, copper cabling, fiber optic cabling, and/or encrypted data links.

Other configurations or number of links in at least the set of links 103 are within the scope of the present disclosure. For example, while FIG. 1 shows a single link for each link of the set of links 103, one or more links within the set of links 103 include a plurality of links. In some embodiments, the set of links 103 is a single link.

The set of antennas 104a, 104b, ..., 104l or 104m is configured to transmit or receive signals with the corresponding set of users (e.g., set of devices 106, 108, etc.) by each corresponding link 105a, 105b, ..., 105l or 105m of a set of links 105.

The set of antennas 104a includes at least one antenna 104a1, 104b1, ..., 104e1 or 104aF, where F is an integer corresponding to a number of antennas in the set of antennas 104a.

The set of antennas 104m includes at least one antenna 104m1, 104m2, ..., 104mf or 104mG, where G is an integer corresponding to a number of antennas in the set of antennas 104G.

For brevity the details of the set of antennas 104b, ..., 104l are omitted, but are similar to at least the set of antennas 104a or 104m, and similar detailed description is omitted.

In some embodiments, at least one set of antennas in the set of antennas 104a, 104b, ..., 104l or 104m corresponds to a panel reflector antenna array. In some embodiments, at least one set of antennas in the set of antennas 104a, 104b, ..., 104l or 104m corresponds to a smart antenna array.

Other configurations or number of antennas in at least the set of antennas 104a, ..., 104m are within the scope of the present disclosure.

The set of devices 106 includes at least device 106a, 106b, ..., 106w or 106x, where x is an integer corresponding to a number of devices in the set of devices 106. In some embodiments, one or more devices in the set of devices 106 corresponds to a user equipment (UE), a computing device, a computing system or a server. In some embodiments, system 1200 (FIG. 12) is an embodiment of one or more devices 106a, 106b, ..., 106x of the set of devices 106.

In some embodiments, one or more of the devices of the set of devices 106 is a type of mobile terminal, fixed terminal, or portable terminal including a desktop computer, laptop computer, notebook computer, netbook computer, tablet computer, wearable circuitry, mobile handset, server, gaming console, or combinations thereof. In some embodiments, one or more of the devices of the set of devices 106 comprises a display by which a user interface is displayed. In some embodiments, the set of devices 106 corresponds to a server farm. In some embodiments, the set of devices 106 corresponds to a data center.

In some embodiments, one or more devices 106a, 106b, ..., 106w or 106x of the set of devices 106 is within cell 101a. In some embodiments, one or more devices 106a, 106b, ..., 106w or 106x of the set of devices 106 is configured to communicate with corresponding node 102a of the set of nodes 102 of the corresponding cell 101a of the set of cells 101 by a corresponding link 105a of a set of links 105.

In some embodiments, one or more devices 106a, 106b, ..., 106w or 106x of the set of devices 106 is configured to run or execute a corresponding application. In some embodiments, the one or more devices 106a, 106b, ..., 106w or 106x of the set of devices 106 is configured to send corresponding user data 130a, 130b, ..., 130w or 130x of a set of user data 130 to the corresponding node 102a of the set of nodes 102 of the corresponding cell 101a of the set of cells 101 by the corresponding link 105a of the set of links 105. In some embodiments, the one or more devices 106a, 106b, ..., 106w or 106x of the set of devices 106 is configured to send the corresponding user data 130a, 130b, ..., 130w or 130x of the set of user data 130 to the corresponding node 102a of the set of nodes 102 of the corresponding cell 101a of the set of cells 101 by the corresponding link 105a of the set of links 105 in response to corresponding instructions from the corresponding application that are being executed by the one or more devices 106a, 106b, ..., 106w or 106x of the set of devices 106.

Other configurations, different types of devices or other number of devices in the set of devices 106 are within the scope of the present disclosure.

The set of devices 108 includes at least device 108a, 108b, ..., 108x or 108y, where y is an integer corresponding to a number of devices in the set of devices 108. In some embodiments, one or more devices in the set of devices 108 corresponds to a UE, a computing device, a computing system or a server. In some embodiments, system 1200 (FIG. 12) is an embodiment of one or more devices 108a, 108b, ..., 108y of the set of devices 108.

In some embodiments, one or more of the devices of the set of devices 108 is a type of mobile terminal, fixed terminal, or portable terminal including a desktop computer, laptop computer, notebook computer, netbook computer, tablet computer, wearable circuitry, mobile handset, server, gaming console, or combinations thereof. In some embodiments, one or more of the devices of the set of devices 108 comprises a display by which a user interface is displayed. In some embodiments, the set of devices 108 corresponds to a server farm. In some embodiments, the set of devices 108 corresponds to a data center.

In some embodiments, one or more devices 108a, 108b, ..., 108x or 108y of the set of devices 108 is within cell 101m. In some embodiments, one or more devices 108a, 108b, ..., 108x or 108y of the set of devices 108 is configured to communicate with corresponding node 102m of the set of nodes 102 of the corresponding cell 101m of the set of cells 101 by a corresponding link 105m of the set of links 105.

In some embodiments, one or more devices 108a, 108b, ..., 108x or 108y of the set of devices 108 is configured to run or execute a corresponding application. In some embodiments, the one or more devices 108a, 108b, ..., 108x or 108y of the set of devices 108 is configured to send corresponding user data 132a, 132b, ..., 132x or 132y of a set of user data 132 to the corresponding node 102m of the set of nodes 102 of the corresponding cell 101m of the set of cells 101 by the corresponding link 105m of the set of links 105. In some embodiments, the one or more devices 108a, 108b, ..., 108x or 108y of the set of devices 108 is configured to send the corresponding user data 132a, 132b, ..., 132x or 132y of the set of user data 132 to the corresponding node 102m of the set of nodes 102 of the corresponding cell 101m of the set of cells 101 by the corresponding link 105m of the set of links 105 in response to corresponding instructions from the corresponding application that are being executed by the one or more devices 108a, 108b, ..., 108x or 108y of the set of devices 108.

Other configurations, different types of devices or other number of devices in the set of devices 108 are within the scope of the present disclosure.

The set of links includes at least link 105a, 105b, ..., 105l or 105m. In some embodiments, each link of the set of links 105 is configured to electromagnetically couple a corresponding node 102a, 102b, ..., 102l or 102m of the set of nodes 102 to a set of users (e.g., set of devices 106, 108, etc.) positioned within a corresponding cell 101a, 101b, ..., 101l or 101m of the set of cells 101.

For ease of illustration, FIG. 1 shows two nodes (e.g., nodes 102a and 102m), and each node 102a or 102m is electromagnetically coupled to a corresponding set of devices 106 or 108 by corresponding link 105a or 105m. However, each link of the set of links 105 within each corresponding cell in the set of cells 101 includes a plurality of links, and the plurality of links are not shown for ease of illustration. Stated differently, while FIG. 1 shows a single link for each link 105a, ..., 105m of the set of links 105, one or more of 105a, ..., 105m of the set of links 105 include a plurality of links.

In some embodiments, at least link 105a, 105b, ..., 105l or 105m of the set of links 105 is a wireless link that includes an uplink and a downlink. In some embodiments, at least one or more of link 105a, 105b, ..., 105l or 105m of the set of links 105 is based on technologies, such as code division multiple access (CDMA), wideband CDMA (WCDMA), time division multiple access (TDMA), frequency division multiple access (FDMA), single carrier frequency division multiple access (SC-FDMA), Orthogonal Frequency Division Multiplexing (OFDM), Orthogonal Frequency Division Multiple Access (OFDMA), time division duplexing (TDD), frequency division duplexing (FDD), Bluetooth, Infrared (IR), or the like, or other protocols that may be used in a wireless communications network or a wired data communications network.

Accordingly, the exemplary illustrations provided herein are not intended to limit the embodiments of the disclosure and are merely to aid in the description of aspects of the embodiments of the disclosure.

Other configurations or number of links in at least the set of links 105 are within the scope of the present disclosure.

The set of devices 116 includes at least device 116a, 116b, . . . , 116n or 116o, where o is an integer corresponding to a number of devices in the set of devices 116.

In some embodiments, one or more devices in the set of devices 116 corresponds to a computing device, computing system or a server. In some embodiments, the set of devices 116 includes a set of servers 126. In some embodiments, each device 116a, 116b, . . . , 116n or 116o in the set of devices 116 includes a corresponding server 126a, 126b, . . . , 126n or 126o of a set of servers 126.

In some embodiments, system 1200 (FIG. 12) is an embodiment of one or more devices 116a, 116b, . . . , 116n or 116o of the set of devices 116. In some embodiments, system 1200 (FIG. 12) is an embodiment of one or more servers 126a, 126b, . . . , 126n or 126o of the set of servers 126. In some embodiments, the set of devices 116 corresponds to a server farm. In some embodiments, the set of devices 116 corresponds to a data center.

Other configurations, different types of devices or other number of sets in the set of devices 116 or the set of servers 126 are within the scope of the present disclosure.

In some embodiments, network 114 corresponds to at least one of a wired or wireless network. In some embodiments, network 114 corresponds to at least one of a radio access network (RAN), a core network, a local area network (LAN), a wide area network (WAN), a metropolitan area network (MAN), an internet area network (IAN), a campus area network (CAN), a virtual private networks (VPN) or combinations thereof. In some embodiments, network 114 corresponds to the Internet.

In some embodiments, network 118 corresponds to at least one of a wired or wireless network. In some embodiments, network 118 corresponds to at least one of a RAN, a LAN, a WAN, a MAN, an IAN, a CAN, a VPN or combinations thereof. In some embodiments, network 118 corresponds to the Internet.

Other configurations, number of networks or different types of network in at least network 114 or 118 are within the scope of the present disclosure.

In some embodiments, at least link 115 or link 117 is a wired link. In some embodiments, at least link 115 or link 117 is a wireless link. In some embodiments, at least link 115 or link 117 corresponds to any transmission medium type; e.g. fiber optic cabling, any wired cabling, and any wireless link type(s). In some embodiments, at least link 115 or link 117 corresponds to shielded, twisted-pair cabling, copper cabling, fiber optic cabling, and/or encrypted data links.

In some embodiments, at least the set of links 103, link 115 or link 117 is based on technologies, such as CDMA, WCDMA, TDMA, FDMA, SC-FDMA, OFDM, OFDMA, TDD, FDD, Bluetooth, IR or the like, or other protocols that may be used in a wireless communications network or a wired data communications network. Accordingly, the exemplary illustrations provided herein are not intended to limit the embodiments of the disclosure and are merely to aid in the description of aspects of the embodiments of the disclosure.

Other configurations or number of links in at least the set of links 103, link 115 or link 117 are within the scope of the present disclosure. For example, while FIG. 1 shows a single link for each of link 115 or link 117, one or more of link 115 or link 117 include a plurality of links.

In some embodiments, by using system 100, geolocation data of users of the set of cells 101 can be passively monitored by the set of servers 126 to automatically determine the location of one or more cells within the set of cells 101 that have one or more disoriented cells. In some embodiments, a disoriented cell includes a cell that has one or more antennas with a deployed azimuth value different from a planned azimuth value. In some embodiments, the disoriented cell is not deployed according to a planned azimuth value, but is deployed with the deployed azimuth value. In some embodiments, disoriented cells can result in RF coverage different than planned, thereby resulting in reduced network efficiency and operation, and increasing network cost.

In some embodiments, the set of servers 126 are configured to automatically determine the locations of disoriented cells within system 100 from a single location, without physically deploying human personnel to each cell site within system 100 to determine which cells are disoriented.

In some embodiments, after the set of servers 126 determine the location of the disoriented cells, human personnel are physically deployed to the location of the disoriented cells where the deployed antenna azimuth of the disoriented cell can be corrected, thereby resulting in optimized RF coverage, increased network efficiency and operation, and lowering network operating costs and manpower costs compared to other approaches where network operators initiate field visits on a regular basis and use tools to determine if cells are disoriented, and then correcting each azimuth mismatch for each of the disoriented cells and becomes a bottleneck for RF optimization activities. Furthermore, in these other approaches, azimuth mismatch can be corrected at a single cell site by an antenna azimuth system (AAS) which corresponds to an extra device on the antenna thereby increasing costs for each cell site.

Other configurations or number of elements in system 100 are within the scope of the present disclosure.

Figure 2:
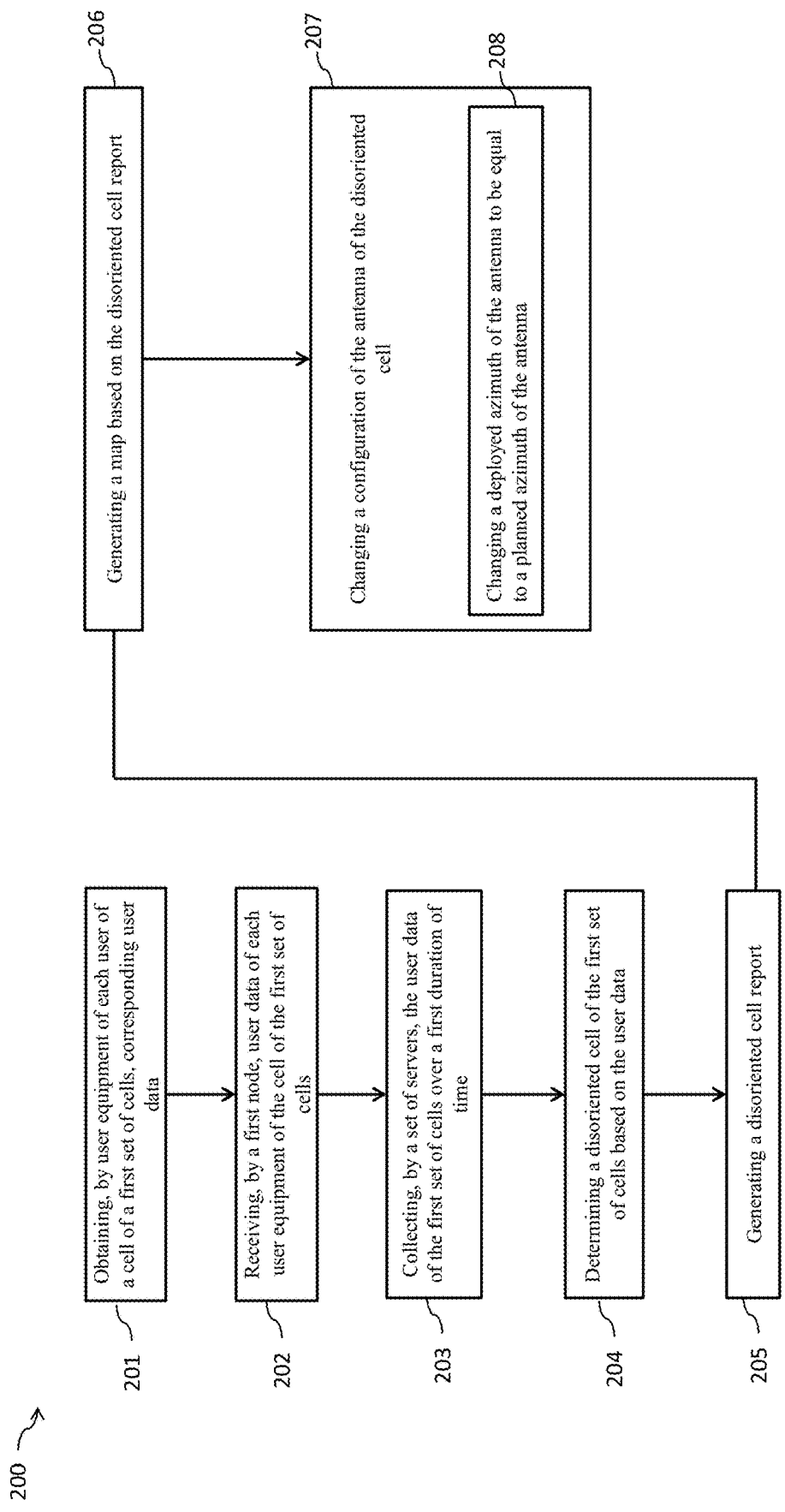
FIG. 2 is a flowchart of a method, in accordance with some embodiments.

FIG. 2 is a flowchart of a method 200, in accordance with some embodiments.

In some embodiments, method 200 is a method of determining a disoriented cell and changing an azimuth of the disoriented cell. In some embodiments, at least portions of method 200 are performed by at least one or more of the set of devices 106 and 108, the set of nodes 204, or the set of servers 126.

In some embodiments, FIG. 2 is a flowchart of a method of operating system 100 of FIG. 1, and similar detailed description is therefore omitted. It is understood that additional operations may be performed before, during, and/or after the method 200 depicted in FIG. 2, and that some other operations may only be briefly described herein. In some embodiments, other order of operations of method 200 is within the scope of the present disclosure. In some embodiments, one or more operations of method 200 are not performed.

Method 200 includes exemplary operations, but the operations are not necessarily performed in the order shown. Operations may be added, replaced, changed order, and/or eliminated as appropriate, in accordance with the spirit and scope of disclosed embodiments. It is understood that method 200 utilizes features of one or more of system 100.

In operation 201 of method 200, user equipment of each user of a cell of a first set of cells is configured to obtain corresponding user data. In some embodiments, each user of the cell of the first set of cells is part of a set of users. In some embodiments, the user data is part of a set of user data. In some embodiments, the set of user data includes at least one of the set of user data 130 or 132.

In some embodiments, user equipment of one or more users in the set of users is configured to run or execute a corresponding application, and the corresponding application instructs the corresponding user equipment to fetch the corresponding user data.

In some embodiments, operation 201 further includes the user equipment of one or more users in the set of users being configured to send the corresponding user data to a corresponding node of a first set of nodes of the corresponding cell of the first of cells by a corresponding link of the set of links in response to corresponding instructions from the corresponding application that are being executed by the user equipment of one or more users in the set of users.

In some embodiments, the user data includes at least one of received signal strength (e.g., signal to noise ratio) of the set of users, geolocation data of the set of users, or a cell identifier of a corresponding cell of the first set of cells configured to serve the set of users. In some embodiments, the geolocation data of each user of the set of users includes a latitude of the user and a longitude of the user.

In some embodiments, the user equipment includes at least the set of equipment 106 or 108. In some embodiments, the first set of cells corresponds to at least the set of cells 101.

In some embodiments, the user data includes at least the set of equipment 106 or 108.

In some embodiments, the link of the set of links includes at least one link of the set of links 105. In some embodiments, the first node includes at least one node of the set of nodes 102.

In operation 202 of method 200, user data of each user equipment of the cell of the first set of cells is received by a first node. In some embodiments, the first node includes at least one node of the set of nodes 102.

In operation 203 of method 200, a set of servers 126 is configured to collect the user data of the first set of cells over a first duration of time. In some embodiments, the first duration of time corresponds to a weekly basis. In some embodiments, operation 203 is performed for a set of cells other than the first set of cells. In some embodiments, the set of servers 126 is configured to collect the user data of the first set of cells from each node of the set of nodes 102.

In some embodiments, the first duration of time corresponds to a daily basis. In some embodiments, the first duration of time corresponds to an hourly basis. In some embodiments, the first duration of time corresponds to a real-time basis. Other time periods for the first duration of time are within the scope of the present disclosure for the automatic polling requests.

In operation 204 of method 200, a disoriented cell of the first set of cells is determined based on the user data. In some embodiments, the set of servers 126 is configured to determine the disoriented cell of the first set of cells.

Figure 5:
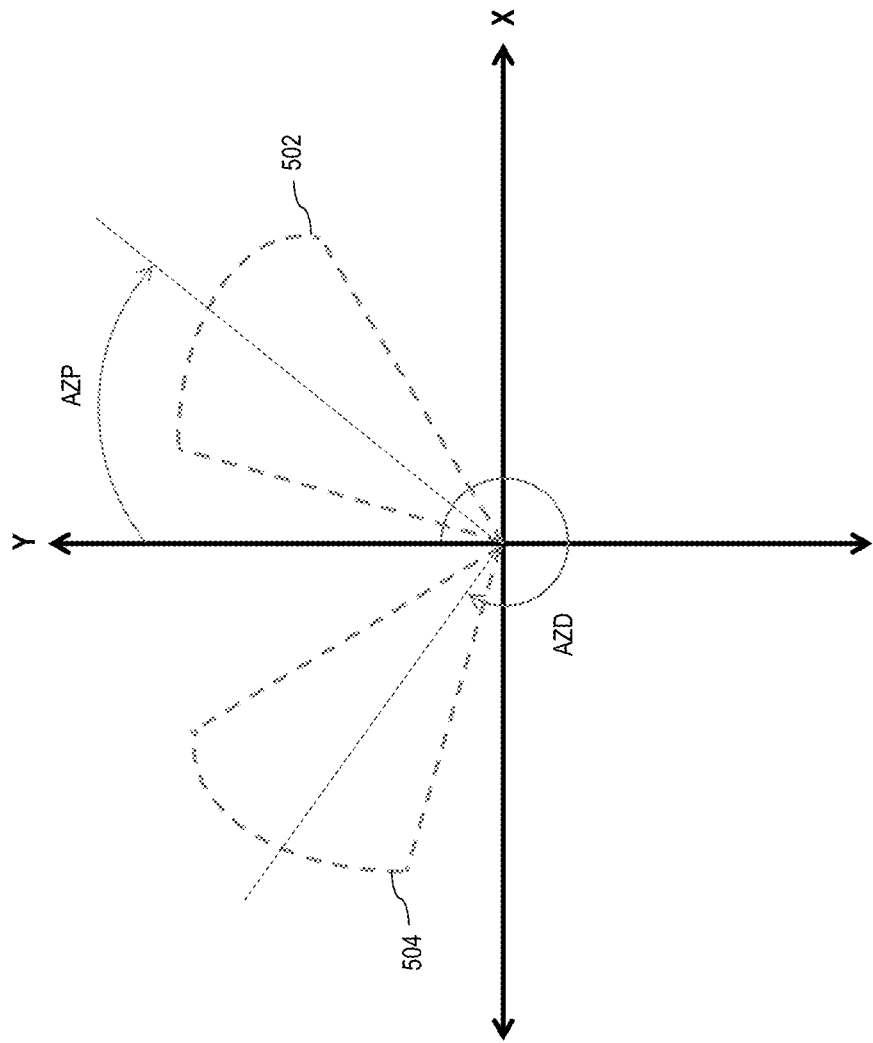
FIG. 5 is a diagram of a disoriented cell, in accordance with some embodiments.
Figure 11A:
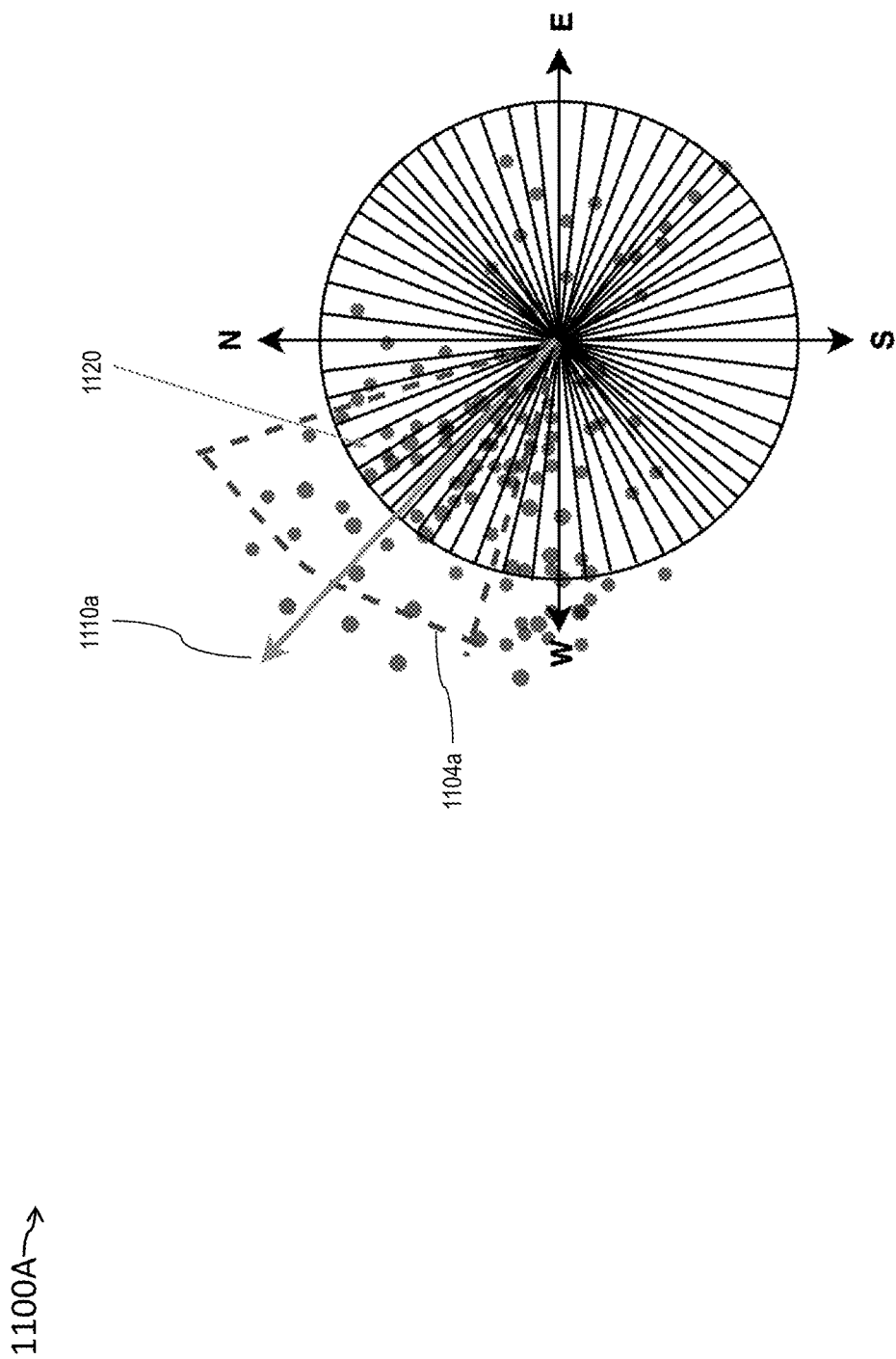
FIGS. 11A-11B are corresponding diagrams of corresponding maps, in accordance with some embodiments.
Figure 11B:
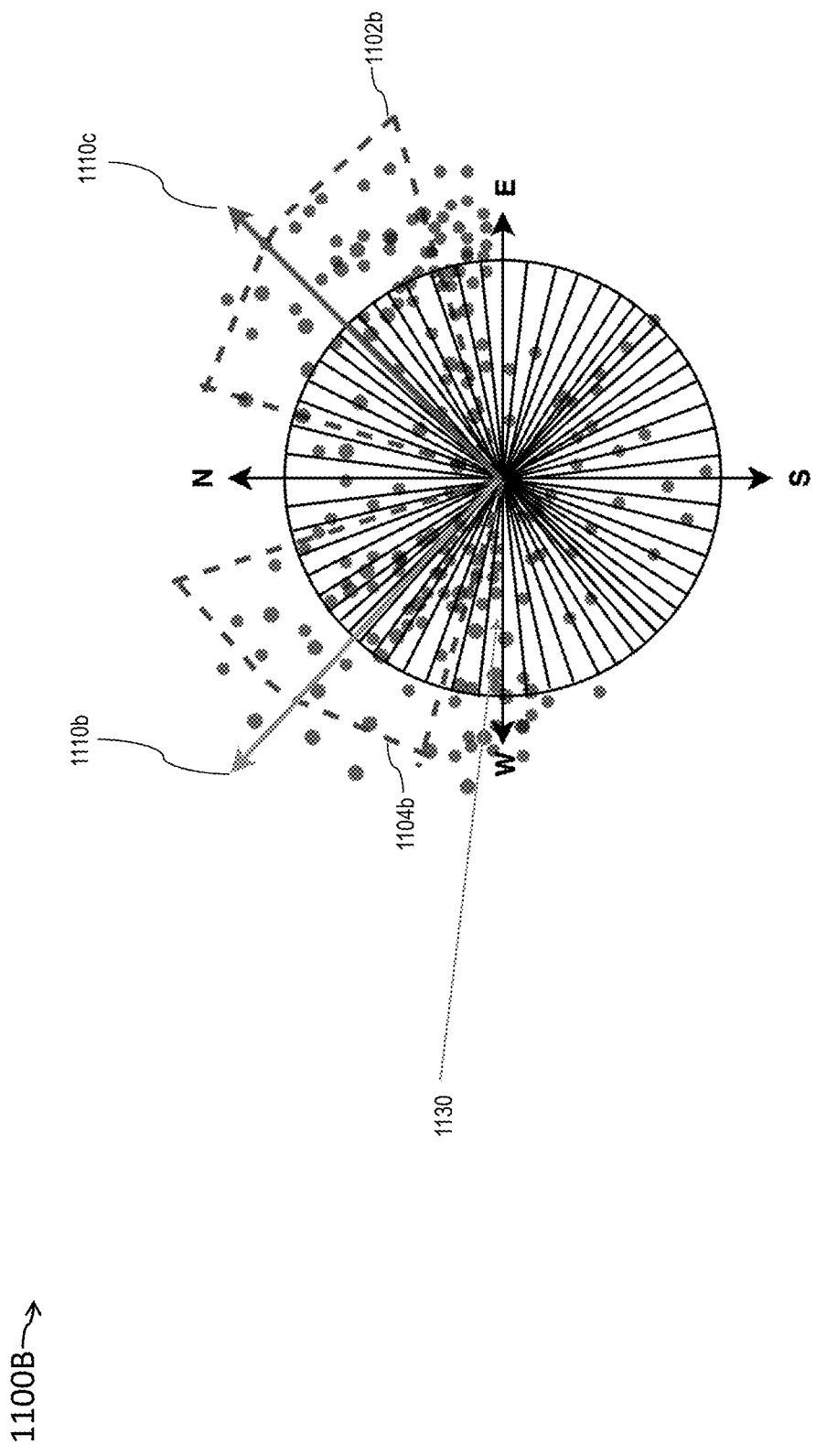

In some embodiments, the disoriented cell includes at least disoriented cell 500 of FIG. 5 or disoriented cell 1104b of FIG. 11B.

In operation 205 of method 200, a disoriented cell report is generated. In some embodiments, the disoriented cell report is generated by the set of servers 126. In some embodiments, the disoriented cell report is generated by other devices, for example devices that are not shown in FIG. 1. In some embodiments, the disoriented cell report includes a disoriented cell report 300 of FIG. 3.

In some embodiments, the disoriented cell report includes identification of disoriented cells, alignment properties of disoriented cells including at least one or more of cell site name, cell name, frequency band, physical parameters, center angle of the planned azimuth, center angle of the deployed azimuth, azimuth deviation between the planned azimuth and the deployed azimuth, cell or sector swap type and remarks. In some embodiments, the disoriented cell report further includes a comparison of the alignment of disoriented cells based on current database values and field measurement values.

In operation 206 of method 200, a map based on the disoriented cell report is generated. In some embodiments, the map displays graphical details of the disoriented cell report. In some embodiments, the map is generated by the set of servers 126. In some embodiments, the map is generated by other devices, for example devices that are not shown in FIG. 1.

In some embodiments, the disoriented cells are visible within the map. In some embodiments, the disoriented cells are visible within the map for specific frequency bands and data availability.

In some embodiments, the map includes visualization of statistics. In some embodiments, the map includes a tabular representation for various geographies including (PAN, Region, Cluster, etc). In some embodiments, geo-located samples of user data are displayed in the map.

In some embodiments, the map includes identification of disoriented cells, alignment properties of disoriented cells including at least one or more of cell site name, cell name, frequency band, physical parameters, center angle of the planned azimuth, center angle of the deployed azimuth, azimuth deviation between the planned azimuth and the deployed azimuth, cell or sector swap type, and remarks will be visible.

In operation 207 of method 200, a configuration of the antenna of the disoriented cell is changed. In some embodiments, the configuration of the antenna of the disoriented cell that is changed includes changing the deployed azimuth value of one or more antennas in the disoriented cell. In some embodiments, the antenna of the disoriented cell includes one or more antennas in the set of antennas 104a, . . . , 104m. In some embodiments, operation 207 is performed for each disoriented cell that is determined by operation 204.

In some embodiments, operation 207 is performed by a human user. In some embodiments, the performance of operation 207 is automated, and operation 207 is performed by a system such as system 1200 of FIG. 12.

In some embodiments, operation 207 includes operation 208.

In operation 208 of method 200, the deployed azimuth of the antenna is changed to be equal to the planned azimuth of the antenna of the disoriented cell.

In some embodiments, operation 208 is performed by a human user. In some embodiments, the performance of operation 208 is automated, and operation 208 is performed by a system such as system 1200 of FIG. 12.

In some embodiments, by using method 200, geolocation data of users of the set of cells 101 can be passively monitored by the set of servers 126 to automatically determine the location of disoriented cells within a cellular network from a single location. In some embodiments, by automatically determining disoriented cells within the cellular network from a single location (e.g., the set of servers 126), the present disclosure does not physically deploy human personnel by field visits to each cell site within the cellular network on a periodic basis to determine which cells are disoriented compared to other approaches.

In some embodiments, after the location of the disoriented cells is determined in operation 204, human personnel can be physically deployed to the location of the disoriented cells, in operations 207-208, where the deployed antenna azimuth of the disoriented cell can be corrected, thereby resulting in optimized RF coverage, increased network efficiency and operation, and lowering network operating costs and manpower costs compared to other approaches where network operators initiate field visits on a regular basis and use tools to determine if cells are disoriented, and then correcting each azimuth mismatch for each of the disoriented cells and becomes a bottleneck for RF optimization activities. Furthermore, in these other approaches, azimuth mismatch can be corrected at a single cell site by AAS which corresponds to an extra device on the antenna thereby increasing costs for each cell site.

FIG. 3 is a diagram of a disoriented cell report 300, in accordance with some embodiments.

In some embodiments, disoriented cell report 300 is generated by operation 205 of method 200.

In some embodiments, disoriented cell report 300 is viewable by a user by way of a user interface (e.g., user interface 1224 in FIG. 12), and is displayed by system 1200.

The disoriented cell report 300 is shown as a table. The disoriented cell report 300 is a listing of each cell of the set of cells 101 of system 100 and at least method 200.

The disoriented cell report 300 is a listing of each cell of the set of cells 101 of system 100, and specifies whether the cell is a disoriented cell or is not a disoriented cell (e.g., normal).

With the exception of row 1, each row in disoriented cell report 300 is an instance object, and is created by the set of servers 126, and is updated each time during execution of method 200 of FIG. 2.

Disoriented cell report 300 includes a list of cell identifiers (IDs) of the cells, a cell site name for the corresponding cell, a cell location for the corresponding cell, the planned azimuth values for the corresponding cell, the deployed azimuth values for the corresponding cell, and the cell status for the corresponding cell.

In some embodiments, the disoriented cell report 300 further includes at least one of a frequency band of the corresponding cell or an azimuth deviation of the corresponding cell.

Disoriented cell report 300 comprises 6 rows and 6 columns. Column 1 comprises cell identifiers (IDs) of the cell. In some embodiments, the cell IDs of the disoriented cell report 300 are useable to identify the corresponding cell. Column 2 comprises a cell name of each corresponding cell in column 1. Column 3 comprises a cell location of each corresponding cell in column 1. Column 4 comprises a planned azimuth of each corresponding cell in column 1. Column 5 comprises a deployed azimuth of each corresponding cell in column 1. Column 6 comprises a status of each corresponding cell in column 1. For example, column 6 specifies whether the corresponding cell is disoriented or non-disoriented (e.g., Normal). Row 1 corresponds to the title fields of disoriented cell report 300.

Each entry in column 1 has a corresponding entry in column 2, a corresponding entry in column 3, a corresponding entry in column 4, a corresponding entry in column 5 and a corresponding entry in column 6, and vice versa.

Figure 6A:
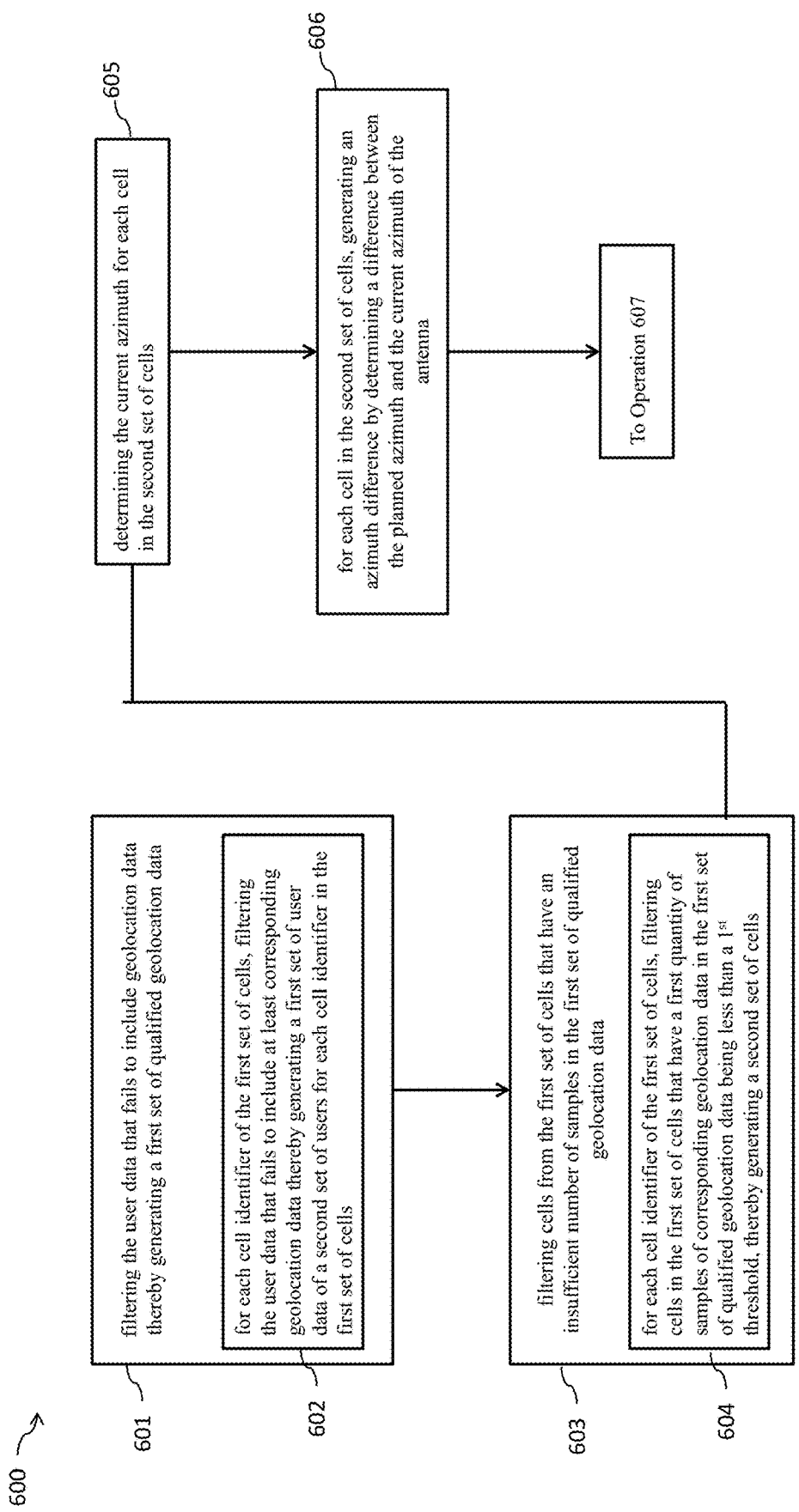
FIGS. 6A-6B are a flowchart of a method, in accordance with some embodiments.
Figure 6B:
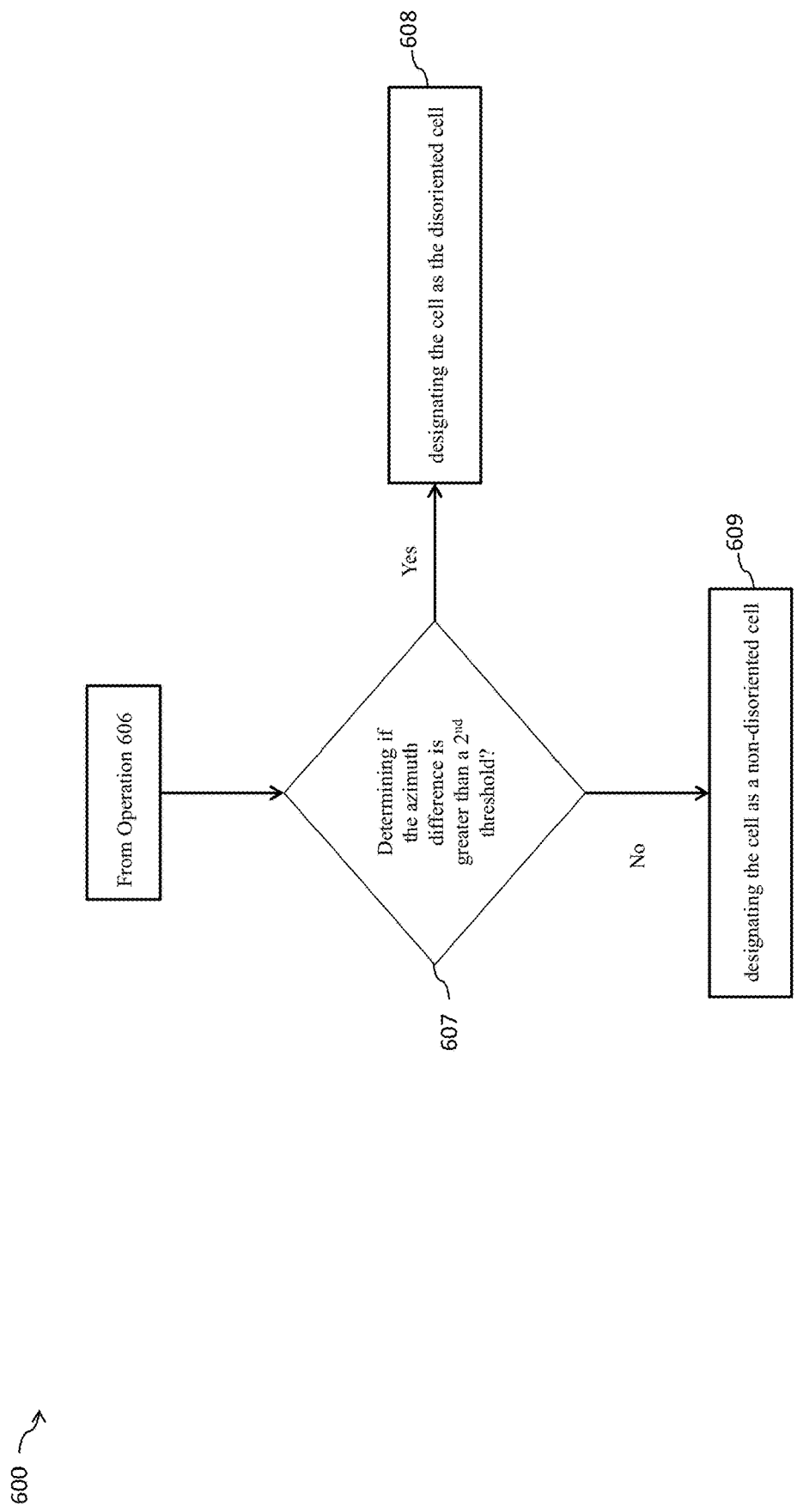
Figure 7A:
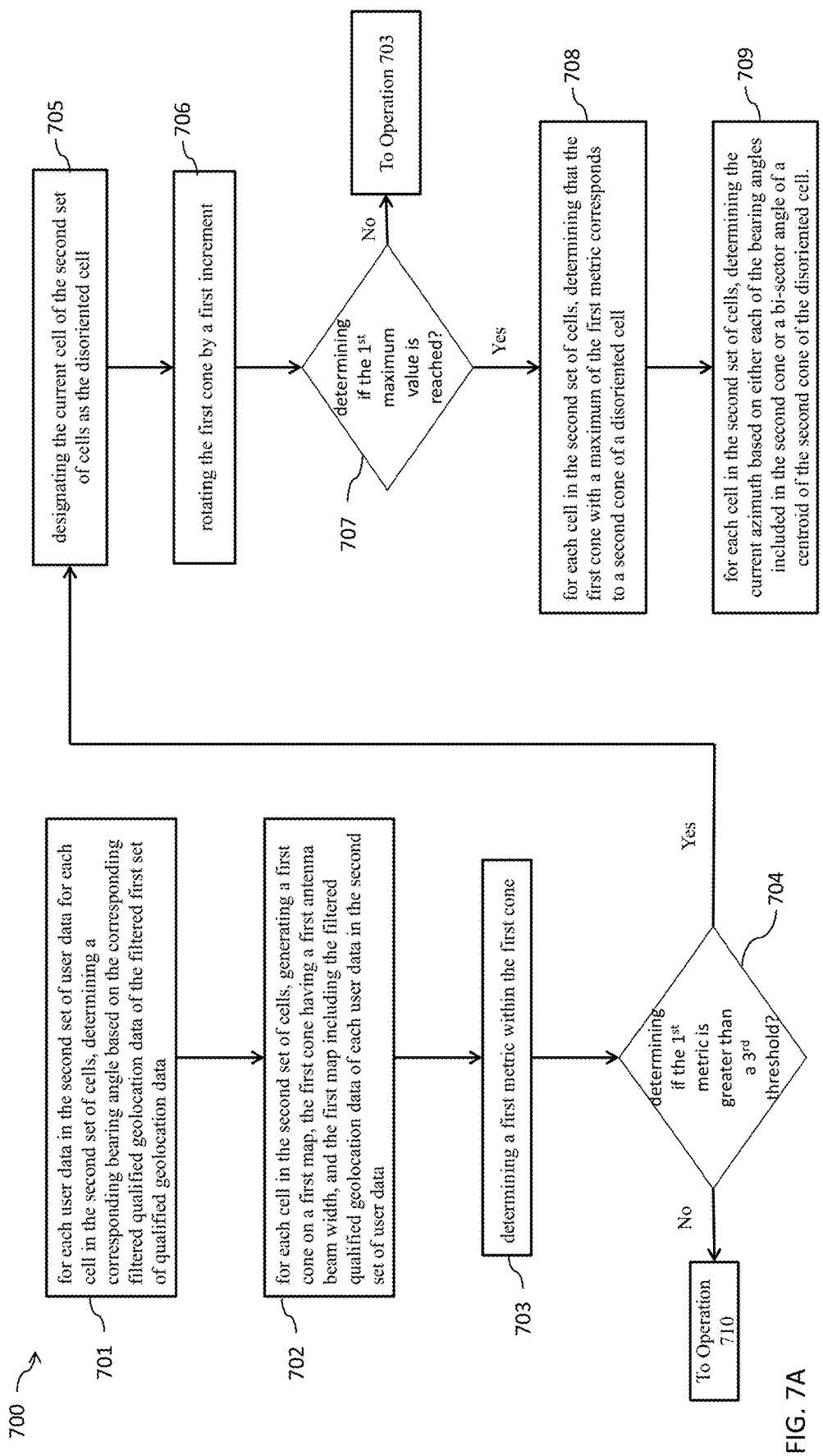
FIGS. 7A-7B are a flowchart of a method, in accordance with some embodiments.
Figure 7B:
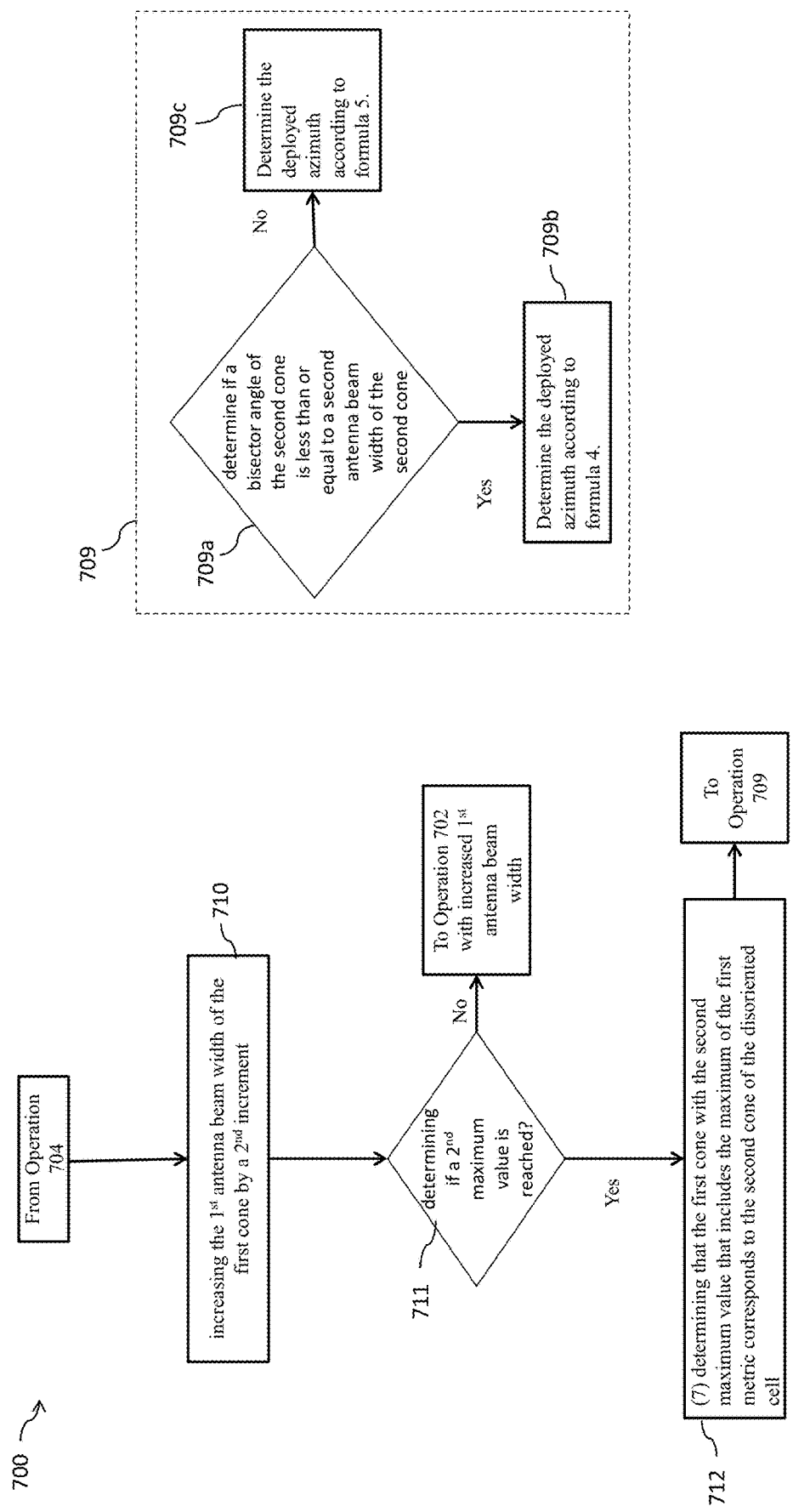

Disoriented cell report 300 is utilized with one or more operations of method 200 of FIG. 2, method 600 of FIGS. 6A-6B or method 700 of FIGS. 7A-7B.

Figure 12:
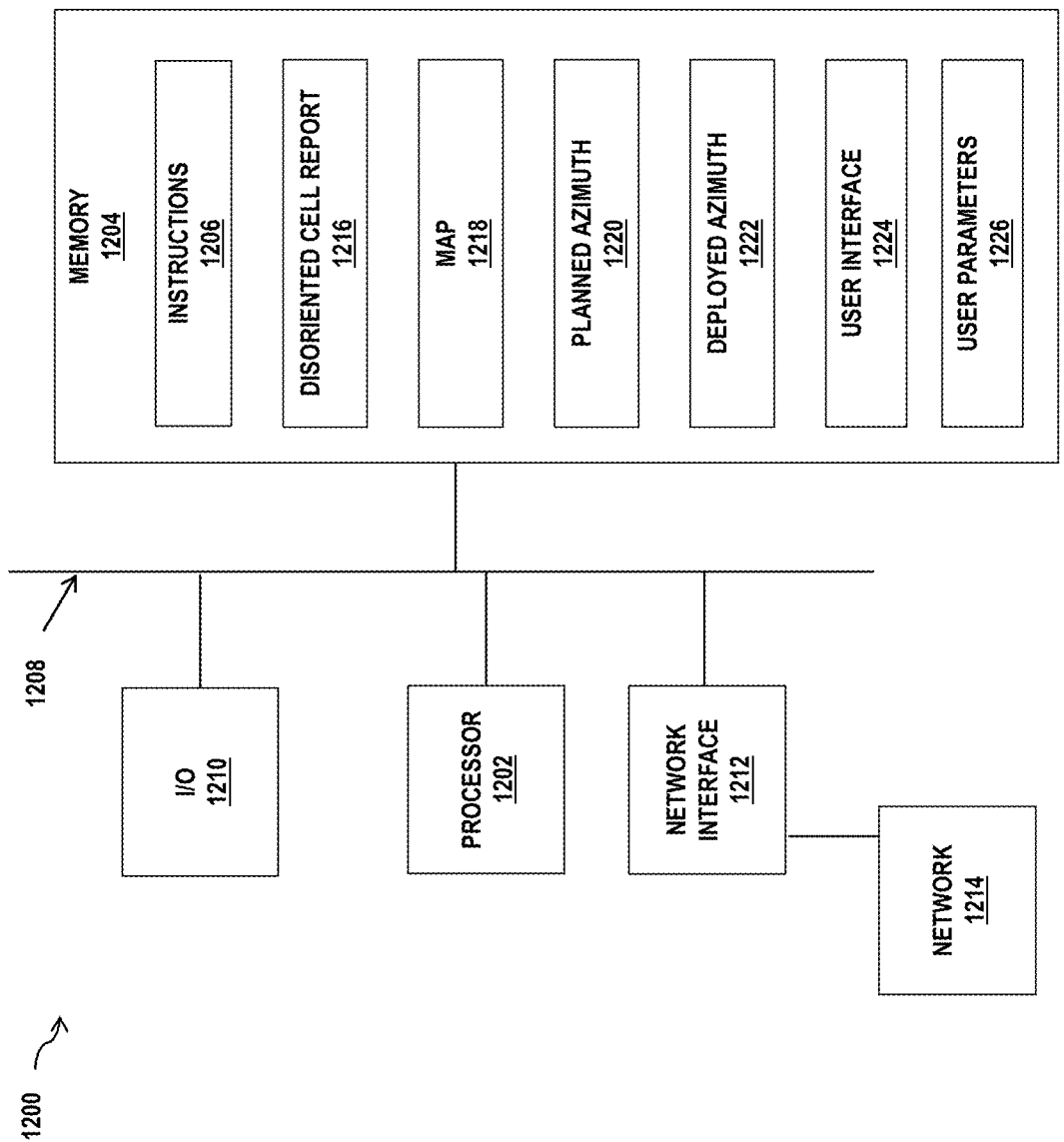
FIG. 12 is a schematic view of a system, in accordance with some embodiments.

In some embodiments, disoriented cell report 300 is stored in memory 1204 of FIG. 12. In some embodiments, disoriented cell report 300 is generated by system 1200 of FIG. 12.

In some embodiments, disoriented cell report 300 is a graphical user interface that facilitates output of a series of cells in the set of cells 101 by way of dragging and dropping one or more objects displayed in the graphical user interface. In some embodiments, user interface is accessible by way of a user terminal (e.g., set of servers 126). In some embodiments, one or more entries or rows in disoriented cell report 300 are selected by a user to view further details of the corresponding cell of the set of cells 101 and the disoriented cells.

In some embodiments, disoriented cell report 300 makes it possible to create one or more maps (e.g., maps 400A-400B) based on the disoriented cell report 300.

In some embodiments, disoriented cell report 300 makes it possible to track and add or remove one or more cells in the set of cells 101. In some embodiments, the selection or creation of one or more cells in the disoriented cell report 300 makes it possible for the user to view the one or more existing or new cells in the set of cells 101.

Other numbers of columns, other numbers of rows, or other types of data in disoriented cell report 300 are within the scope of the present disclosure.

Figure 4A:
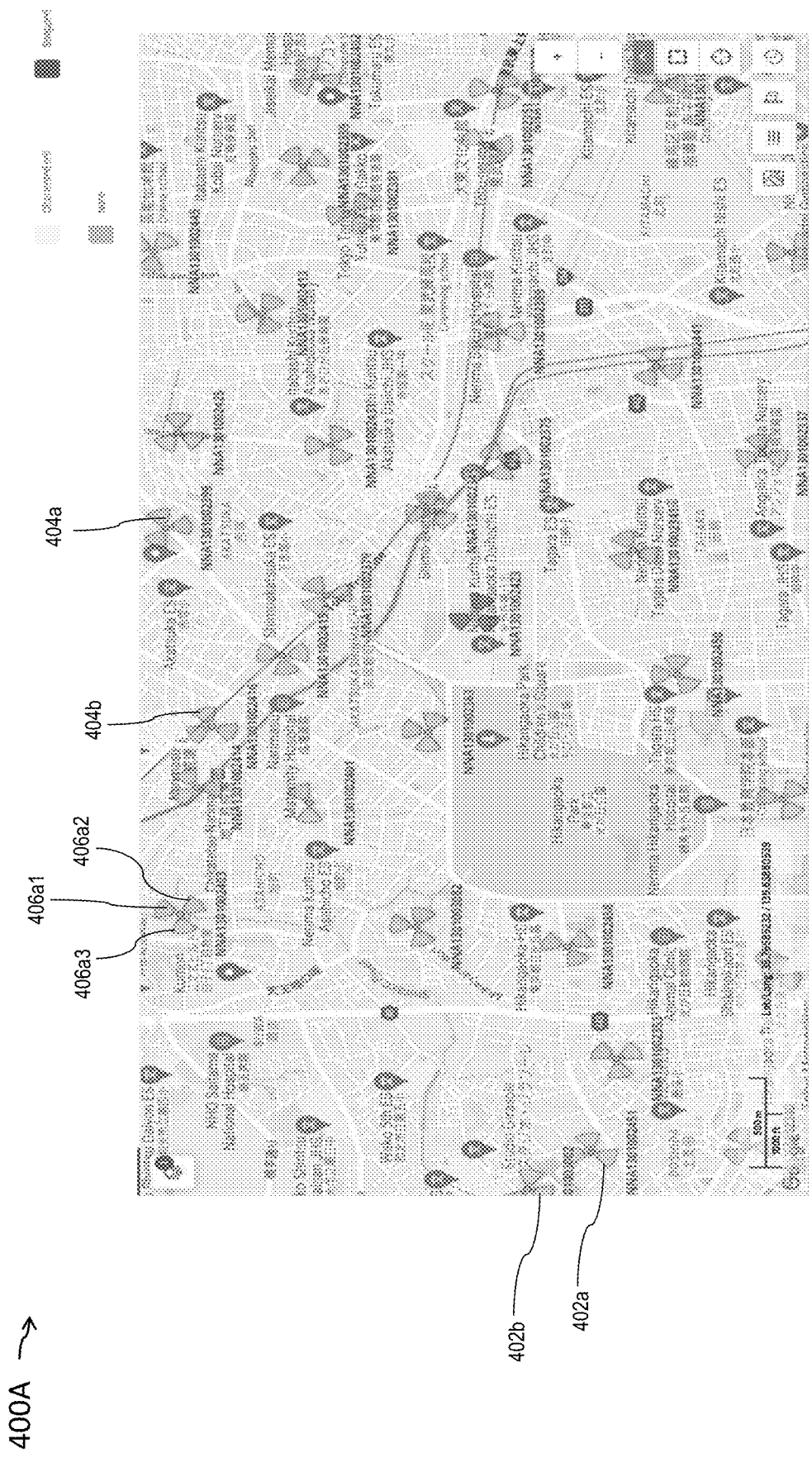
FIGS. 4A-4B are corresponding diagrams of corresponding maps, in accordance with some embodiments.
Figure 4B:
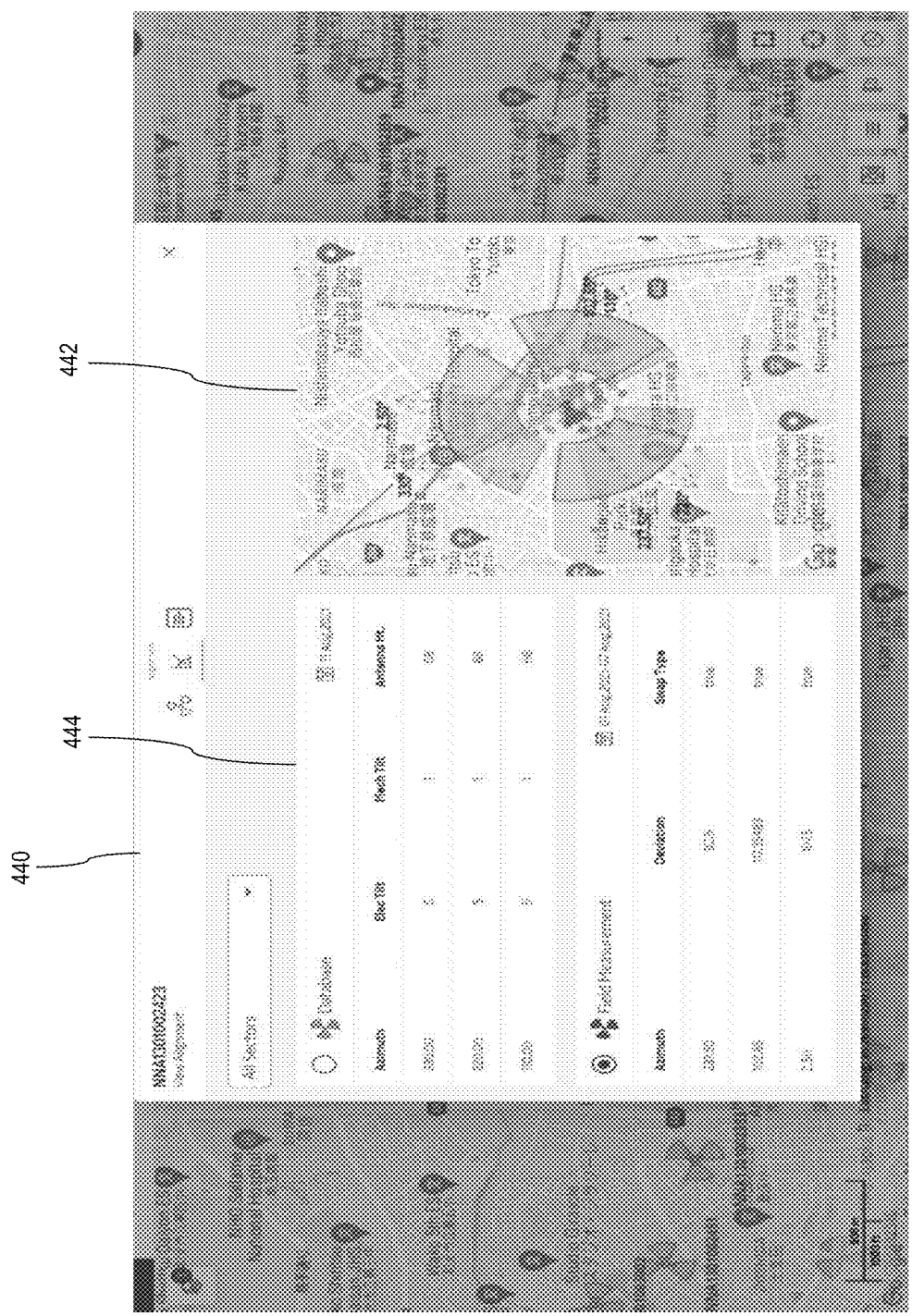

FIGS. 4A-4B are corresponding diagrams of corresponding maps 400A-400B, in accordance with some embodiments.

In some embodiments, maps 400A-400B are generated by operation 206 of method 200.

In some embodiments, maps 400A-400B are viewable by a user by way of a user interface (e.g., user interface 1224 in FIG. 12), and is displayed by system 1200.

In some embodiments, maps 400A-400B are visual representations of the disoriented cell report 300 of FIG. 3.

In some embodiments, maps 400A-400B include visualization of statistics. In some embodiments, maps 400A-400B include a tabular representation for various geographies including (PAN, Region, Cluster, etc). In some embodiments, geo-located samples of user data are displayed in maps 400A-400B.

In some embodiments, maps 400A-400B include identification of disoriented cells, alignment properties of disoriented cells including at least one or more of cell site name, cell name, frequency band, physical parameters, center angle of the planned azimuth, center angle of the deployed azimuth, azimuth deviation between the planned azimuth and the deployed azimuth, cell or sector swap type, and remarks will be visible.

Map 400B is a variation of map 400A, and similar detailed description is therefore omitted. In comparison with map 400A, map 400B further includes a field 440 (described below), and similar detailed description is therefore omitted.

Maps 400A-400B are shown as corresponding maps. Maps 400A-400B include details from each cell of the set of cells 101. Maps 400A-400B include each of the details of the disoriented cell report 300 of FIG. 3, but are displayed in map formats.

Maps 400A-400B include each cell of the set of cells 101 of system 100, and specifies whether the cell is a disoriented cell or is not a disoriented cell (e.g., normal).

Maps 400A-400B include a set of disoriented cells 402. Each sector in the set of disoriented cells 402 are disoriented. For example, set of disoriented cells 402 includes disoriented cells 402a and disoriented cells 402b, and each sector in disoriented cells 402a and disoriented cells 402b are disoriented.

Maps 400A-400B further include a set of non-disoriented cells 404. Each sector in the set of non-disoriented cells 404 are not disoriented. For example, set of non-disoriented cells 404 includes non-disoriented cells 404a and non-disoriented cells 404b, and each sector in non-disoriented cells 404a and non-disoriented cells 404b are not disoriented.

Maps 400A-400B further include a set of cells 406. The set of cells 406 includes cells that have combinations of disoriented cells and non-disoriented cells. For example, set of cells 406 includes non-disoriented cells (e.g., sectors 406a1 and 406a2) and disoriented cells (sector 406a3).

In some embodiments, maps 400A-400B are created by the set of servers 126, and is updated each time during execution of method 200 of FIG. 2.

In comparison with map 400A, map 400B further includes a field 440, and similar detailed description is therefore omitted.

Field 440 includes a zoomed-in portion 442 of map 400A and a parameter portion 444. In some embodiments, the parameter portion 444 displays further details of specific cells that are positioned within the zoomed-in portion 442 of map 400A. In some embodiments, the parameters shown in the parameter portion 444 can be specified by the user. Other parameters in the parameter portion 444 are within the scope of the present disclosure.

Maps 400A-400B are utilized with one or more operations of method 200 of FIG. 2, method 600 of FIGS. 6A-6B or method 700 of FIGS. 7A-7B.

In some embodiments, maps 400A-400B are stored in memory 1204 of FIG. 12. In some embodiments, maps 400A-400B are generated by system 1200 of FIG. 12.

Other numbers of cells or other types of data in maps 400A-400B are within the scope of the present disclosure.

In some embodiments, maps 400A-400B include a graphical user interface that facilitates output of a series of cells in the set of cells 101 by way of dragging and dropping one or more objects displayed in the graphical user interface. In some embodiments, the user interface is accessible by way of a user terminal (e.g., set of servers 126). In some embodiments, one or more regions of the maps 400A-400B are selected by a user to view further details of the corresponding cell of the set of cells 101 and the disoriented cells.

In some embodiments, maps 400A-400B make it possible to track and add or remove one or more cells in the set of cells 101. In some embodiments, the selection or creation of one or more cells in maps 400A-400B make it possible for the user to view the one or more existing or new cells in the set of cells 101.

Other numbers of cells, other types of cells or other types of data in maps 400A-400B are within the scope of the present disclosure.

FIG. 5 is a diagram of a disoriented cell 500, in accordance with some embodiments.

In some embodiments, disoriented cell 500 is an example of portions of operations 205-208 of method 200. For example, in some embodiments, disoriented cell 500 is an illustration of a disoriented cell of a map (similar to maps 400A-400B) that is generated by operation 205 of method 200, and how the disoriented cell is corrected by operations 207-208 of method 200, and similar detailed description is therefore omitted.

For ease of illustration, disoriented cell 500 shows two sectors; however, other numbers of sectors for disoriented cell 500 are within the scope of the present disclosure.

In some embodiments, disoriented cell 500 is utilized with one or more operations of method 200 of FIG. 2, method 600 of FIGS. 6A-6B or method 700 of FIGS. 7A-7B.

Disoriented cell 500 includes a planned sector 502 and a deployed sector 504.

Planned sector 502 corresponds to a designed sector or a planned sector of a cell (e.g., disoriented cell 500) of the set of cells 101. Planned sector 502 has a planned azimuth AZP. Planned sector 502 is the planned sector of the cell that would be generated by one or more antennas of the set of antennas $104a, \ldots, 104m$ with the planned azimuth AZP.

Deployed sector 504 corresponds to a measured sector or a deployed sector of a cell (e.g., disoriented cell 500) of the set of cells 101. Deployed sector 504 has a deployed azimuth AZD. Deployed sector 504 is the deployed or actual sector of the cell that is generated by one or more antennas of the set of antennas $104a, \ldots, 104m$ with the deployed azimuth AZD.

A difference between the planned azimuth AZP and the deployed azimuth AZD corresponds to an azimuth difference AD, and is expressed by equation 1 as:

$$AD = AZP - AZD \quad (1)$$

As shown in FIG. 5, the planned sector 502 and the deployed sector 504 provide RF coverage to different areas due to the azimuth difference AZ between the planned azimuth AZP and the deployed azimuth AZD.

In some embodiments, after operation 208 of method 200, the deployed azimuth AZD of one or more antennas of the set of antennas $104a, \ldots, 104m$ is changed to be equal to the planned azimuth AZD of the one or more antennas of the set of antennas $104a, \ldots, 104m$ of the disoriented cell 500.

In some embodiments, disoriented cell 500 is stored in memory 1204 of FIG. 12. In some embodiments, disoriented cell 500 is generated by system 1200 of FIG. 12.

Other numbers of cells, sectors or other types of data in disoriented cell 500 are within the scope of the present disclosure.

FIGS. 6A-6B are a flowchart of a method 600, in accordance with some embodiments.

Figure 6C:
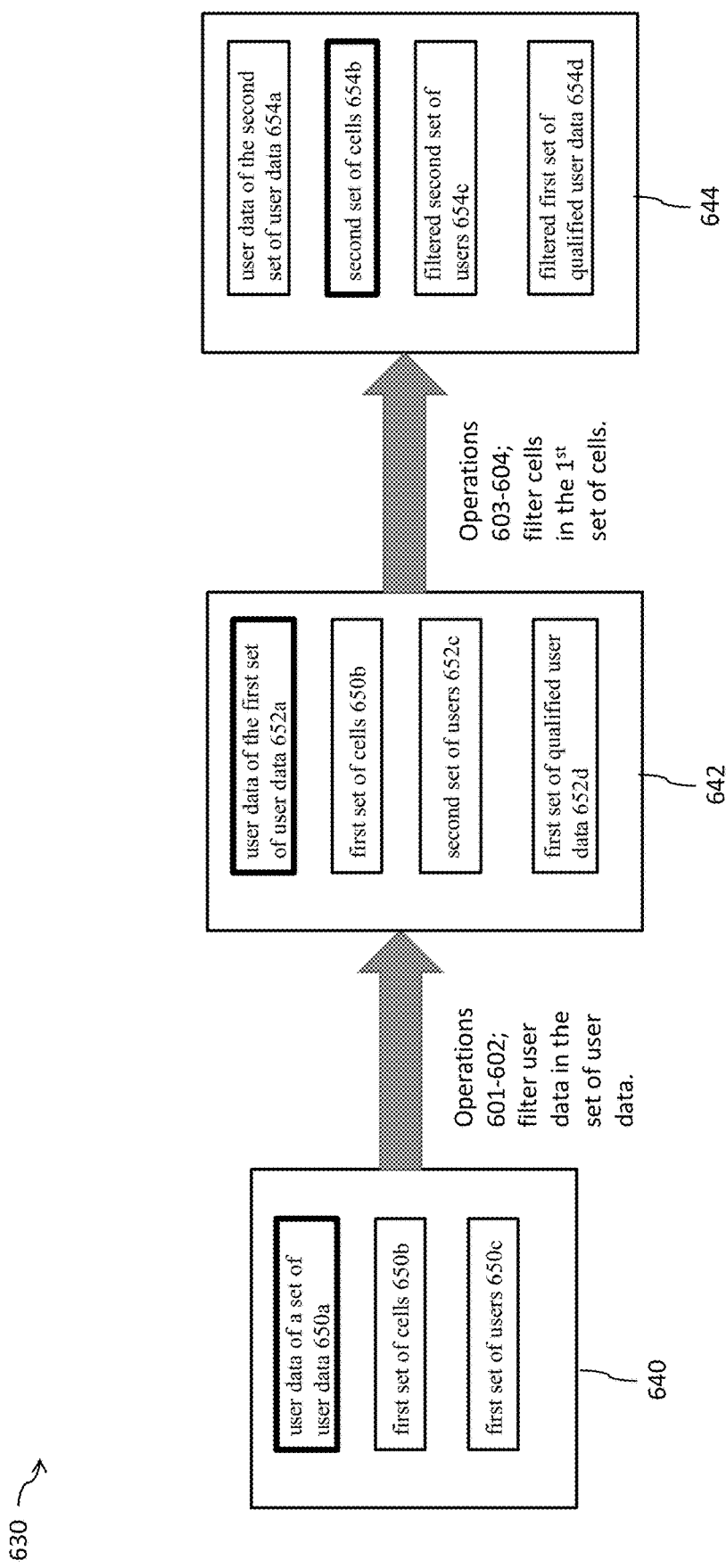
FIG. 6C is an exemplary diagram that illustrates operations of the method of FIGS. 6A-6B, in accordance with some embodiments.

FIG. 6C is an exemplary diagram 630 that illustrates operations 601-604 of method 600, in accordance with some embodiments.

Method 600 is an embodiment of at least operation 203 and 204 of method 200 of FIG. 2, and similar detailed description is therefore omitted. For example, in some embodiments, method 600 is a method of at least collecting the user data of the first set of cells over a first duration of time, and determining a disoriented cell of the first set of cells based on the user data.

In some embodiments, FIGS. 6A-6B are a flowchart of a method of operating system 100 of FIG. 1 or the set of servers 126, and similar detailed description is therefore omitted. It is understood that additional operations may be performed before, during, and/or after the method 600 depicted in FIGS. 6A-6B, and that some other operations may only be briefly described herein. In some embodiments, other order of operations of method 600 is within the scope of the present disclosure. In some embodiments, one or more operations of method 600 are not performed.

Method 600 includes exemplary operations, but the operations are not necessarily performed in the order shown. Operations may be added, replaced, changed order, and/or eliminated as appropriate, in accordance with the spirit and scope of disclosed embodiments. It is understood that method 600 utilizes features of one or more of system 100, method 200, disoriented cell report 300, maps 400A-400B, disoriented cell 500, map 800 of FIG. 8, map 900 of FIG. 9, map 1000A of FIG. 10A and map 1000B of FIG. 10B, In operation 601 of method 600, the user data of a set of user data 650a (FIG. 6C) that fails to include geolocation data is filtered thereby generating a first set of qualified geolocation data 652d.

In some embodiments, the user data of the set of user data 650a is the user data of a first set of cells 650b. In some embodiments, the user data of the set of user data 650a is the user data of a first set of users 650c.

In some embodiments, the first set of qualified geolocation data 652d is geolocation data of corresponding users of the set of users that includes corresponding geolocation data. For example, in some embodiments, the user data of the set of user data 650a of corresponding users is received by one or more nodes of the set of nodes 102 that has a corresponding received signal strength (SNR), but the corresponding user data of the set of user data 650a does not include geolocation data as the GPS of the corresponding user is turned off, and is therefore designated as "non-qualified geolocation data." In some embodiments, operation 601 filters the non-qualified geolocation data from the user data of the set of user data 650a thereby generating the first set of qualified geolocation data 652d.

In some embodiments, operation 601 is performed by the set of servers 126.

In some embodiments, operation 601 further includes operation 602.

In operation 602 of method 600, for each cell identifier of the first set of cells 650b, the user data of the set of user data 650a that fails to include at least corresponding geolocation data is filtered thereby generating a first set of user data 652a of a second set of users 652c for each cell identifier in the first set of cells 650b.

In some embodiments, the first set of user data 652a includes the first set of qualified geolocation data 652d. In some embodiments, each user data in the first set of user data 652a has a corresponding qualified geolocation data of the first set of qualified geolocation data 652d.

In some embodiments, each user in the second set of users 652c has corresponding user data of the first set of user data 652a.

In some embodiments, operation 602 is performed by the set of servers 126.

In operation 603 of method 600, cells in the first set of cells 650b that have an insufficient number of samples in the first set of qualified geolocation data 652d are filtered from the first set of cells 650b.

In some embodiments, the insufficient number of samples includes a first threshold. In some embodiments, the first threshold is input or set by a human user. In some embodiments, the first threshold is input by a human user, and is viewable by the user by way of a user interface (e.g., user interface 1224 in FIG. 12), and is displayed by system 1200.

In some embodiments, the first threshold is equal to or greater than 10 samples. In some embodiments, the first threshold is equal to or greater than 250 samples. In some embodiments, if the first threshold is less than 250 samples, then the number of samples in the first set of qualified geolocation data 652d is insufficient to accurately determine if a cell is a disoriented cell as there are not enough data points, and cells that are not disoriented may be improperly designated as disoriented cells due to the insufficient number of data points.

In some embodiments, if the first threshold is greater than or equal to 250 samples, then the number of samples in the first set of qualified geolocation data 652d is sufficient to accurately determine if a cell is a disoriented cell as there are enough data points, and cells that are disoriented may be accurately designated as disoriented cells, and cells that are not disoriented cells may be accurately designated as not being disoriented cells due to the sufficient number of data points.

Other values or ranges for the first threshold are within the scope of the present disclosure.

In some embodiments, operation 603 is performed by the set of servers 126.

In some embodiments, operation 603 further includes operation 604.

In operation 604 of method 600, for each cell identifier of the first set of cells 650b, cells in the first set of cells 650b that have a first quantity of samples of corresponding geolocation data in the first set of qualified geolocation data 652d being less than the first threshold are filtered, thereby generating a second set of cells 654b.

In some embodiments, each cell in the second set of cells 654b has a second set of user data 654a of a filtered second set of users 654c.

In some embodiments, each user in the filtered second set of users 654c has corresponding user data of the second set of user data 654a.

In some embodiments, the second set of user data 654a includes the filtered first set of qualified geolocation data 654d. In some embodiments, each user data in the second set of user data 654a has a corresponding filtered qualified geolocation data of the filtered first set of qualified geolocation data 654d.

In some embodiments, operation 604 is performed by the set of servers 126.

In operation 605 of method 600, the deployed azimuth AZD for each cell in the second set of cells is determined. In some embodiments, operation 605 is performed by the set of servers 126.

In operation 606 of method 600, an azimuth difference AD is generated for each cell in the second set of cells. In some embodiments, operation 606 includes determining the azimuth difference AD for each cell in the second set of cells. In some embodiments, operation 606 is performed by the set of servers 126.

In some embodiments, the azimuth difference AD is determined based on a difference between the planned azimuth AZP and the deployed azimuth AZD. In some embodiments, the azimuth difference AD is determined according to formula 1.

In operation 607 of method 600, a determination is made if the azimuth difference AD is greater than a second threshold. In some embodiments, operation 607 includes taking the absolute value of the azimuth difference AD, and determining if the absolute value of the azimuth difference AD is greater than the second threshold.

In some embodiments, the second threshold is input or set by a human user. In some embodiments, the second threshold is input by a human user, and is viewable by the user by way of a user interface (e.g., user interface 1224 in FIG. 12), and is displayed by system 1200.

In some embodiments, the second threshold is equal to or greater than 1 degree. In some embodiments, the second threshold is equal to or greater than 15 degrees. In some embodiments, if the second threshold is less than 15 degrees, then the number of cells in the second set of cells that are designated as disoriented cells is increased compared to second threshold values that are greater than 15 degrees resulting in method 600 being less accurate by unnecessarily changing the configurations of antennas of disoriented cells resulting in reduced RF coverage, decreased network efficiency and operation, and increasing network operating costs and manpower costs.

In some embodiments, if the second threshold is equal to or greater than 15 degrees, then the number of cells in the second set of cells that are designated as disoriented cells is decreased compared to second threshold values that are less than 15 degrees resulting in method 600 being more accurate by accurately changing the configurations of antennas of disoriented cells resulting in optimized RF coverage, increased network efficiency and operation, and decreasing network operating costs and manpower costs.

Other values or ranges for the second threshold are within the scope of the present disclosure.

In some embodiments, if the absolute value of the azimuth difference AD is greater than the second threshold, then the current cell is a disoriented cell, the result of operation 607 is a "Yes", and method 600 proceeds to operation 608.

In some embodiments, if the absolute value of the azimuth difference AD is not greater than the second threshold, then the current cell is not a disoriented cell, the result of operation 607 is a "No", and method 600 proceeds to operation 609.

In some embodiments, operation 607 is performed by the set of servers 126.

In operation 608 of method 600, the cell is designated as the disoriented cell in response to determining that the azimuth difference is greater than the second threshold.

In some embodiments, operation 608 is performed by the set of servers 126.

In operation 609 of method 600, the cell is designated as a non-disoriented cell in response to determining that the azimuth difference is not greater than the second threshold. In some embodiments, operation 609 includes the cell being designated as the non-disoriented cell in response to determining that the azimuth difference is less than or equal to the second threshold.

In some embodiments, operation 609 is performed by the set of servers 126.

In some embodiments, operations 601-604 are embodiments of operation 203 of method 200, and similar detailed description is therefore omitted. In some embodiments, operations 605-609 are embodiments of operation 204 of method 200, and similar detailed description is therefore omitted.

In some embodiments, method 600 is an embodiment of operation 204 of method 200, and similar detailed description is therefore omitted.

In some embodiments, one or more of the operations of method 600 is not performed. By utilizing method 600, one or more elements of system 100 is configured to achieve the benefits discussed above with respect to system 100 and method 200.

FIG. 6C is an exemplary diagram 630 that illustrates operations 601-604 of method 600, in accordance with some embodiments.

Diagram 630 includes regions 640, 642 and 644.

Region 640 includes user data of the set of user data 650, the first set of cells 650b and the first set of users 650c prior to operations 601-602.

Region 642 includes user data of the first set of user data 652a, the first set of cells 650b, the second set of users 652c and the first set of qualified user data 652d after operations 601-602.

Region 644 includes user data of the second set of user data 654a, the second set of cells 654b, the filtered second set of users 654c and the filtered first set of qualified user data 654d after operations 603-604.

Other configurations of diagram 630 are within the scope of the present disclosure.

FIGS. 7A-7B are a flowchart of a method 700, in accordance with some embodiments.

Method 700 is an embodiment of at least operation 605 of method 600 of FIG. 6, and similar detailed description is therefore omitted. For example, in some embodiments, method 700 is a method of at least determining the deployed azimuth for each cell in the second set of cells 654b.

In some embodiments, FIGS. 7A-7B are a flowchart of a method of operating system 100 of FIG. 1 or the set of servers 126, and similar detailed description is therefore omitted. It is understood that additional operations may be performed before, during, and/or after the method 700 depicted in FIGS. 7A-7B, and that some other operations may only be briefly described herein. In some embodiments, other order of operations of method 700 is within the scope of the present disclosure. In some embodiments, one or more operations of method 700 are not performed.

Method 700 includes exemplary operations, but the operations are not necessarily performed in the order shown. Operations may be added, replaced, changed order, and/or eliminated as appropriate, in accordance with the spirit and scope of disclosed embodiments. It is understood that method 700 utilizes features of one or more of system 100, method 200, disoriented cell report 300, maps 400A-400B, disoriented cell 500, method 600, diagram 630, map 800 of FIG. 8, map 900 of FIG. 9, map 1000A of FIG. 10A and map 1000B of FIG. 10B, In operation 701 of method 700, for each user data in the second set of user data 654a and for each cell in the second set of cells 654b, a corresponding bearing angle is determined based on the corresponding filtered qualified geolocation data of the filtered first set of qualified geolocation data 654d.

In some embodiments, the corresponding bearing angle is with respect to true north from the corresponding cell of the second set of cells 654b. In some embodiments, the corresponding bearing angle of method 700 belong to a set of bearing angles BAT for each user data in the second set of user data 654a and for each cell in the second set of cells 654b.

Figure 8:
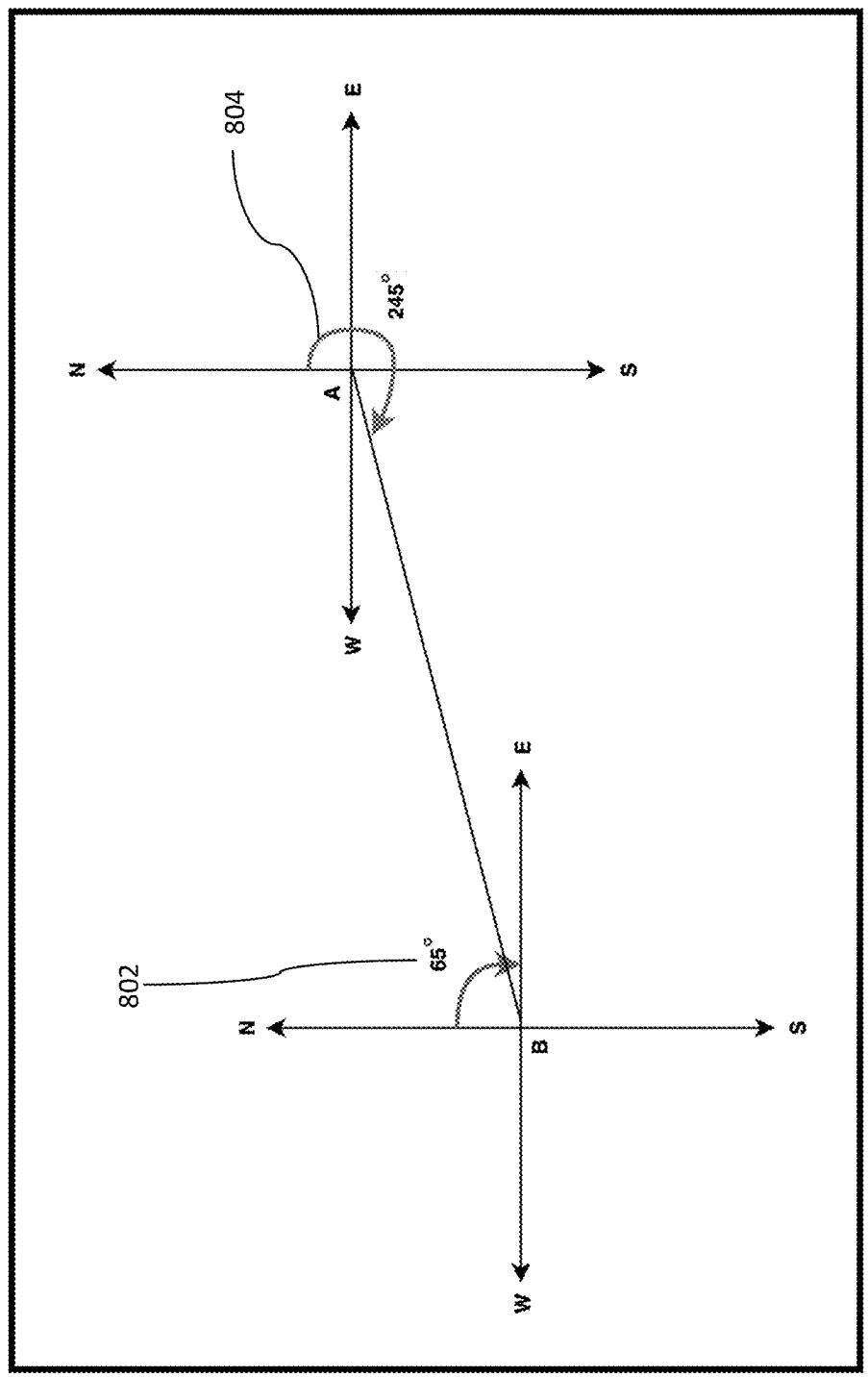
FIG. 8 is a diagram of a map, in accordance with some embodiments.

In some embodiments, the bearing angles of method 700 is similar to a bearing angle 802 of user B with respect to cell A shown in FIG. 8, and similar detailed description is therefore omitted. In some embodiments, the exemplary bearing angle 802 of user B in FIG. 8 is shown with respect to a cell B of the corresponding cell of the second set of cells 654b. In some embodiments, the exemplary bearing angle 804 of cell B of the corresponding cell of the second set of cells 654b in FIG. 8 is shown with respect to user A of the corresponding cell of the second set of cells 654b.

In some embodiments, operation 701 is performed by the set of servers 126.

In operation 702 of method 700, for each cell in the second set of cells 654b, a first cone is generated on a first map. In some embodiments, the first cone has a first antenna beam width.

In some embodiments, the first cone includes at least one of cone 902, 904, 920, 930, 1002, 1004, 1006, 1104a, 1104b or 1102b (FIGS. 8-11B) or sector 502 or 504.

In some embodiments, the first map includes at least one of map 400A, 400B, 800, 900, 1000, 1100A or 1100B (FIGS. 8-11B) or disoriented cell 500.

In some embodiments, the first antenna beam width includes at least one of antenna beam width 912 or 1012.

In some embodiments, the first map includes the filtered qualified geolocation data of each user data in the second set of user data 654a. In some embodiments, a first vertex of the first cone corresponds to a location of the corresponding cell of the second set of cells 654b on the first map.

In some embodiments, the first vertex of the first cone includes the origin of the x-axis and the y-axis shown in at least one of map 900, 1000, 1100A or 1100B (FIGS. 8-11B) or disoriented cell 500. In some embodiments, the first vertex of the first cone includes the origin of the x-axis and the y-axis shown in cell A of map 800.

In some embodiments, operation 702 is performed by the set of servers 126.

In operation 703 of method 700, a first metric is determined for each cell in the second set of cells 654b.

In some embodiments, the first metric includes a first quantity of samples in the second set of user data 654a that are within the first cone. In some embodiments, the first quantity of samples in the second set of user data 654a that are within the first cone corresponds to a number of samples that have corresponding qualified geolocation data (e.g., belong to the filtered first set of qualified user data 654d) that are within the first cone.

In some embodiments, the first metric includes determining a first percentage of samples in the second set of user data 654a that are within the first cone. In some embodiments, the first percentage of samples in the second set of user data 654a that are within the first cone corresponds to a percentage of the number of samples that have corresponding qualified geolocation data (e.g., belong to the filtered first set of qualified user data 654d) that are within the first cone.

In some embodiments, the first percentage of samples FPS is expressed by formula 2 as:

$$FPS \text{ in a cone} = (NSFC/TNS)*100 \quad (2)$$

Where NSFC is the number of samples within the first cone, and TNS is the total number of samples within the map of the same cell.

In some embodiments, NSFC is equal to the first quantity of samples in the second set of user data 654a that are within the first cone, and TNS is equal to the total number of samples in the cell of the first map.

In some embodiments, NSFC ranges from 1% to 100%. In some embodiments, TNS ranges from 1% to 100%. Other values or ranges for at least one of NSFC or TNS are within the scope of the present disclosure.

In some embodiments, operation 703 is performed by the set of servers 126.

In operation 704 of method 700, for each cell in the second set of cells 654b, a determination is made if the first metric is greater than a third threshold.

In some embodiments, the third threshold is input or set by a human user. In some embodiments, the third threshold is input by a human user, and is viewable by the user by way of a user interface (e.g., user interface 1224 in FIG. 12), and is displayed by system 1200.

In some embodiments, the third threshold is equal to or greater than 1%. In some embodiments, the third threshold ranges from about 60% to about 100%. In some embodiments, if the third threshold is less than 60%, then the number of samples falling within each cone for each cell in the second set of cells 654b is insufficient to accurately determine if a cell is a disoriented cell as there are not enough data points, and cells that are not disoriented may be improperly designated as disoriented cells due to the insufficient number of data points.

In some embodiments, if the third threshold is greater than or equal to 60%, then the number of samples falling within each cone for each cell in the second set of cells 654b is sufficient to accurately determine if a cell is a disoriented cell as there are enough data points, and cells that are disoriented may be accurately designated as disoriented cells, and cells that are not disoriented cells may be accurately designated as not being disoriented cells due to the sufficient number of data points.

Other values or ranges for the third threshold are within the scope of the present disclosure. In some embodiments, the third threshold is based on configurations from equipment vendors.

In some embodiments, if the first metric is greater than the third threshold, then the result of operation 704 is a "Yes", and method 700 proceeds to operation 705. In some embodiments, if the first metric is not greater than the third threshold, then the result of operation 704 is a "No", and method 700 proceeds to operation 710.

In some embodiments, if the first quantity of samples in the second set of user data 654a that are within the first cone or the first percentage of samples in the second set of user data 654a that are within the first cone is greater than the third threshold, then the corresponding first quantity of samples or corresponding first percentage of samples is sufficient to designate the current cell as a disoriented cell, the result of operation 704 is a "Yes", and method 700 proceeds to operation 705.

In some embodiments, if the first quantity of samples in the second set of user data 654a that are within the first cone or the first percentage of samples in the second set of user data 654a that are within the first cone is not greater than the third threshold, then the corresponding first quantity of samples or corresponding first percentage of samples is not sufficient to designate the current cell as a disoriented cell, the result of operation 704 is a "No", and method 700 proceeds to operation 710.

In some embodiments, operation 704 is performed by the set of servers 126.

In operation 705 of method 700, the current cell of the second set of cells 654b is designated as a disoriented cell. In some embodiments, operation 705 is repeated for each cell in the second set of cells 654b that satisfies the third threshold condition of operation 704.

In some embodiments, operation 705 is performed by the set of servers 126.

In operation 706 of method 700, the first cone is rotated by a first increment.

In some embodiments, the first cone is rotated by the first increment in a clockwise direction with respect to the Y-axis. In some embodiments, the first cone is rotated by the first increment in a counterclockwise direction with respect to the Y-axis.

In some embodiments, the first cone is rotated by the first increment in a clockwise direction with respect to the X-axis. In some embodiments, the first cone is rotated by the first increment in a counterclockwise direction with respect to the X-axis.

In some embodiments, the first increment is input or set by a human user. In some embodiments, the first increment is input by a human user, and is viewable by the user by way of a user interface (e.g., user interface 1224 in FIG. 12), and is displayed by system 1200.

In some embodiments, the first increment ranges from about 1 degree to about 90 degrees. In some embodiments, the first increment ranges from about 3 degrees to about 10 degrees. In some embodiments, if the first increment is less than 3 degrees, then the number of times operations 703-707 are repeated is increased resulting in more processing power, and a longer time to yield the number of disoriented cells.

In some embodiments, if the first increment is greater than 10 degrees, then after each time the first cone is rotated by the first increment, a number of samples for each cell in the second set of cells 654b may not be included in the first cone, resulting in inaccurate results in determining if a cell is a disoriented cell as some data points may be excluded.

In some embodiments, if the first increment ranges from about 3 degrees to about 10 degrees, then after each time the first cone is rotated by the first increment, a number of samples for each cell in the second set of cells 654b included in the first cone is sufficient to result in accurate results in determining if a cell is a disoriented cell as the number of excluded data points is reduced compared with when the first increment is greater than 10 degrees, but the number of times operations 703-707 are repeated is reduced compared with when the first increment is less than 3 degrees, thereby resulting in less processing power, and a shorter time to yield the number of disoriented cells.

Other values or ranges for the first increment are within the scope of the present disclosure.

In some embodiments, the first increment ranges from about 1 degree increments to about 120 degree increments.

In some embodiments, operation 706 is performed by the set of servers 126.

In operation 707 of method 700, a determination is made if a cumulative rotational amount of the first cone is equal to a first maximum value. In some embodiments, the cumulative rotational amount of the first cone corresponds to the cumulative amount that the first cone has been rotated since being created for the current cell.

In some embodiments, if the cumulative rotational amount of the first cone is equal to the first maximum value, then the current cell is no longer rotated by operation 706, the result of operation 707 is a "Yes", and method 700 proceeds to operation 708.

In some embodiments, if the cumulative rotational amount of the first cone is not equal to the first maximum value, then the result of operation 707 is a "No", and method 700 returns to operation 703.

In some embodiments, the first maximum value is input or set by a human user. In some embodiments, the first maximum value is input by a human user, and is viewable by the user by way of a user interface (e.g., user interface 1224 in FIG. 12), and is displayed by system 1200.

In some embodiments, the first maximum value is equal to 360 degrees.

In some embodiments, operation 707 is performed by the set of servers 126.

In operation 708 of method 700, the first cone with a maximum of the first metric is determined to correspond to a second cone of a disoriented cell. In some embodiments, operation 708 is repeated for each cell in the second set of cells 654b.

In some embodiments, the first cone with a maximum value of the first quantity of samples is determined to correspond to the second cone of the disoriented cell. In some embodiments, the second cone is the first cone with the maximum value of the first quantity of samples.

In some embodiments, the first cone with a maximum value of the first percentage of samples is determined to correspond to the second cone of the disoriented cell. In some embodiments, the second cone is the first cone with the maximum value of the first percentage of samples.

In some embodiments, the second cone includes at least one of cone 902, 904, 920, 930, 1002, 1004, 1006, 1104a, 1104b or 1102b (FIGS. 8-11B) or sector 502 or 504.

In some embodiments, operation 708 is performed by the set of servers 126.

In operation 709 of method 700, the deployed azimuth is determined based on at least one of a bisector angle of a centroid of the second cone of the disoriented cell or each of the bearing angles BAT included in the second cone. In some embodiments, operation 709 is repeated for each cell in the second set of cells 654b.

In some embodiments, for operation 709 of method 700, the deployed azimuth is determined based on the bisector angle of the centroid of the second cone of the disoriented cell as discussed in operation 709b. In some embodiments, for operation 709 of method 700, the deployed azimuth is determined based on each of the bearing angles included in the second cone as discussed in operation 709b.

In some embodiments, operation 709 includes at least operation 709a, 709b or 709c.

In operation 709a, a determination is made if a bisector angle BA2 of the second cone is less than or equal to a second antenna beam width BW2 of the second cone.

In some embodiments, if the bisector angle BA2 of the second cone is less than or equal to a second antenna beam width BW2 of the second cone, then the result of operation 709a is a "Yes", and method 700 proceeds to operation 709b.

In some embodiments, if the bisector angle BA2 of the second cone is greater than the second antenna beam width BW2 of the second cone, then the result of operation 709a is a "No", and method 700 proceeds to operation 709c.

In some embodiments, the bisector angle BA2 includes at least one of bisector angle 1110a, 1110b or 1110c.

In some embodiments, the second antenna beam width BW2 includes at least one of antenna beam width 912 or 1012.

In some embodiments, the bisector angle BA2 of the second cone is determined according to formula 3 as:

$$BA2 = LR + (UR - LR)/2 \qquad (3)$$

Where the lower range LR is equal to the lower range of the second cone in degrees, and the upper range UR is equal to the upper range of the second cone in degrees, and the bisector angle BA2 is in degrees. In some embodiments, each of the lower range LR, the upper range UR and the bisector angle BA2 are in radians.

In operation 709b of method 700, the deployed azimuth AZD is determined according to formula 4.

In some embodiments, the deployed azimuth AZD is determined according to formula 4 as:

$$AZD = BA2 \qquad (4)$$

In some embodiments, operation 709b includes the deployed azimuth AZD being set equal to the second antenna beam width BW2. In some embodiments, after operation 709b, method 700 returns to operation 709 or ends.

In operation 709c of method 700, the deployed azimuth AZD is determined according to formula 5.

In some embodiments, the deployed azimuth AZD is determined according to formula 5 as:

$$AZD = \text{DEGREES}(\text{ATAN2}(\text{Sum of COS}(BAT1), \text{Sum of SIN}(BAT1))) \quad (5)$$

In some embodiments, BAT1 corresponds to a list of each bearing angle of all the samples in the present cell in radians), DEGREES is an operation to convert the current value in radians to a new value in degrees, and the deployed azimuth AZD has units of degrees.

As shown in formula 5, BAT1 corresponds to a list of each bearing angle of all the samples in the present cell in radians, thus the SIN and COS operations of formula 5 are performed on each bearing angle within the present cell that are in the set of bearing angles BAT.

In some embodiments, the deployed azimuth AZD is negative (AZDN), and is converted to a positive angle according to formula 6 as:

$$AZD = AZDN + 360 \quad (6)$$

In some embodiments, after operation 709c, method 700 returns to operation 709 or ends.

Tables 1 and 2 illustrate a non-limiting example of sample data that demonstrates application of formulas 3-6, in accordance with some embodiments. Other types of data, values of data or quantities of data in Tables 1-2 are within the scope of the present disclosure.

For example, Table 1 includes sample data, in accordance with some embodiments.

For example, Table 2 includes sample data based on the application of formulas 3-6 to the sample data of Table 1, in accordance with some embodiments.

In operation 710 of method 700, the first antenna beam width of the first cone is increased by a second increment.

In some embodiments, the second increment is input or set by a human user. In some embodiments, the second increment is input by a human user, and is viewable by the user by way of a user interface (e.g., user interface 1224 in FIG. 12), and is displayed by system 1200.

In some embodiments, the second increment ranges from about 1 degree to about 90 degrees. In some embodiments, the second increment ranges from about 1 degrees to about 10 degrees. In some embodiments, if the second increment is less than 1 degrees, then the number of times operations 703-711 are repeated is increased resulting in more processing power, and a longer time to yield the number of disoriented cells.

In some embodiments, if the second increment is greater than 10 degrees, then after each time the first antenna beam width of the first cone is increased by the second increment, a number of samples for each cell in the second set of cells 654b included in the first cone is increased, but may be attributed to an overly inclusive, increased first antenna beam width that obscures the accuracy in determining if a cell is a disoriented cell.

In some embodiments, if the second increment ranges from about 1 degrees to about 10 degrees, then after each time the first antenna beam width of the first cone is increased by the second increment, a number of samples for each cell in the second set of cells 654b included in the first cone is increased and is sufficient to result in accurate results in determining if a cell is a disoriented cell as the increased first antenna beam width is not overly inclusive and does not

TABLE 1

| Angle | Count of samples | RSRP | Radian value of all the RSRP samples | Cos Value of all the Radian values | Sin Value of all the Radian values |
|---|---|---|---|---|---|
| 276.83 | 1 | −112 | 4.831594968 | 0.118923868 | −0.992903376 |
| 259.16 | 1 | −96 | 4.523195289 | −0.188067035 | −0.982156195 |
| 252.03 | 1 | −76 | 4.398753314 | −0.30851898 | −0.951218187 |
| 287.64 | 1 | −79 | 5.02026506 | 0.30303527 | −0.952979342 |
| 165.02 | 1 | −74 | 2.880142332 | −0.966016112 | 0.258481858 |

In some embodiments, Tables 1-2 are based on the second beam width BW2 being equal to 79 degrees.

In some embodiments, Tables 1-2 are based on the upper range UR being equal to 354 degrees, and the lower range LR being equal to 275 degrees, and thus the bisector angle BA2 is determined according to formula 3, and is equal to 314.5=(275+((354−275)/2)).

TABLE 2

| Calculation | |
|---|---|
| Max Samples | 234 |
| Total Samples | 301 |
| Sample Percentage | 77.74086379 |
| Bisector Angle | 314.5 |
| Planned Azimuth | 0 |
| Deviation of Planned Azimuth and Bisector Angle | −314.5 |
| If Deviation is negative | 45.5 |
| Sum of Cos | −1.04064299 |
| Sum of Sin | −3.620775241 |
| Center angle | −106.0351215 |
| Corrected Center Angle | 253.9648785 |

In some embodiments, operation 709 is performed by the set of servers 126.

obscure the accuracy in determining if a cell is a disoriented cell compared with when the second increment is greater than 10 degrees, but the number of times operations 703-711 are repeated is reduced compared with when the second increment is less than 1 degrees, thereby resulting in less processing power, and a shorter time to yield the number of disoriented cells.

Other values or ranges for the second increment are within the scope of the present disclosure.

In operation 711 of method 700, a determination is made if the increased antenna beam width of the first cone is equal to a second maximum value.

In some embodiments, if the increased antenna beam width of the first cone is equal to the second maximum value, then the antenna beam width of the current cell is no longer increased by operation 710, the result of operation 711 is a "Yes", and method 700 proceeds to operation 712.

In some embodiments, if the increased antenna beam width of the first cone is not equal to the second maximum value, then the result of operation 711 is a "No", and method 700 returns to operation 702 with the increased antenna beam width as being the increased antenna beam width of the first cone.

In some embodiments, the second maximum value is input or set by a human user. In some embodiments, the second maximum value is input by a human user, and is viewable by the user by way of a user interface (e.g., user interface 1224 in FIG. 12), and is displayed by system 1200.

In some embodiments, the second maximum value is equal to 90 degrees. Other second maximum values are within the scope of the present disclosure.

In some embodiments, operation 710 is performed by the set of servers 126.

In operation 712 of method 700, the first cone with the second maximum value of the first metric that includes the maximum number of samples of the first quantity of samples or the maximum of the first percentage of samples of the first cones is determined to correspond to the second cone of the disoriented cell.

In some embodiments, operation 711 includes determining that the first cone with the second maximum value that corresponds to the second cone of the disoriented cell, and includes the maximum of samples of the first quantity of samples or the maximum of the first percentage of samples, in response to determining that no cell in the second set of cells 654b has the first quantity of samples or the first percentage of samples being greater than the third threshold.

In some embodiments, the second cone of the disoriented cell of operation 711 corresponds to the first cone with the second maximum value, and has a maximum number of samples of the first quantity of samples or the maximum of the first percentage of samples of the first cones, and does not satisfy the third threshold condition of operation 704.

In some embodiments, operation 712 is performed by the set of servers 126.

In some embodiments, one or more of the operations of method 700 is not performed. By utilizing method 700, one or more elements of system 100 is configured to achieve the benefits discussed above with respect to system 100 and method 200.

FIG. 8 is a diagram of a map 800, in accordance with some embodiments.

In some embodiments, map 800 is an embodiment of maps 400A-400B, and similar detailed description is therefore omitted. In some embodiments, map 800 is generated by operation 206 of method 200.

In some embodiments, map 800 shows bearing angle 802 and 804 that correspond to the bearing angles of method 700, and similar detailed description is therefore omitted.

In some embodiments, map 800 is a visual representation of a cell A and a user B.

User B has a bearing angle 802 with respect to cell A.

Cell A has a bearing angle 804 with respect to user B.

In some embodiments, the exemplary bearing angle 802 of user B in FIG. 8 is shown with respect to a cell B of the corresponding cell of the second set of cells 654b. In some embodiments, the exemplary bearing angle 804 of cell B of the corresponding cell of the second set of cells 654b in FIG. 8 is shown with respect to user A of the corresponding cell of the second set of cells 654b.

Other numbers of bearing angles or cells in map 800 are within the scope of the present disclosure.

Figure 9:
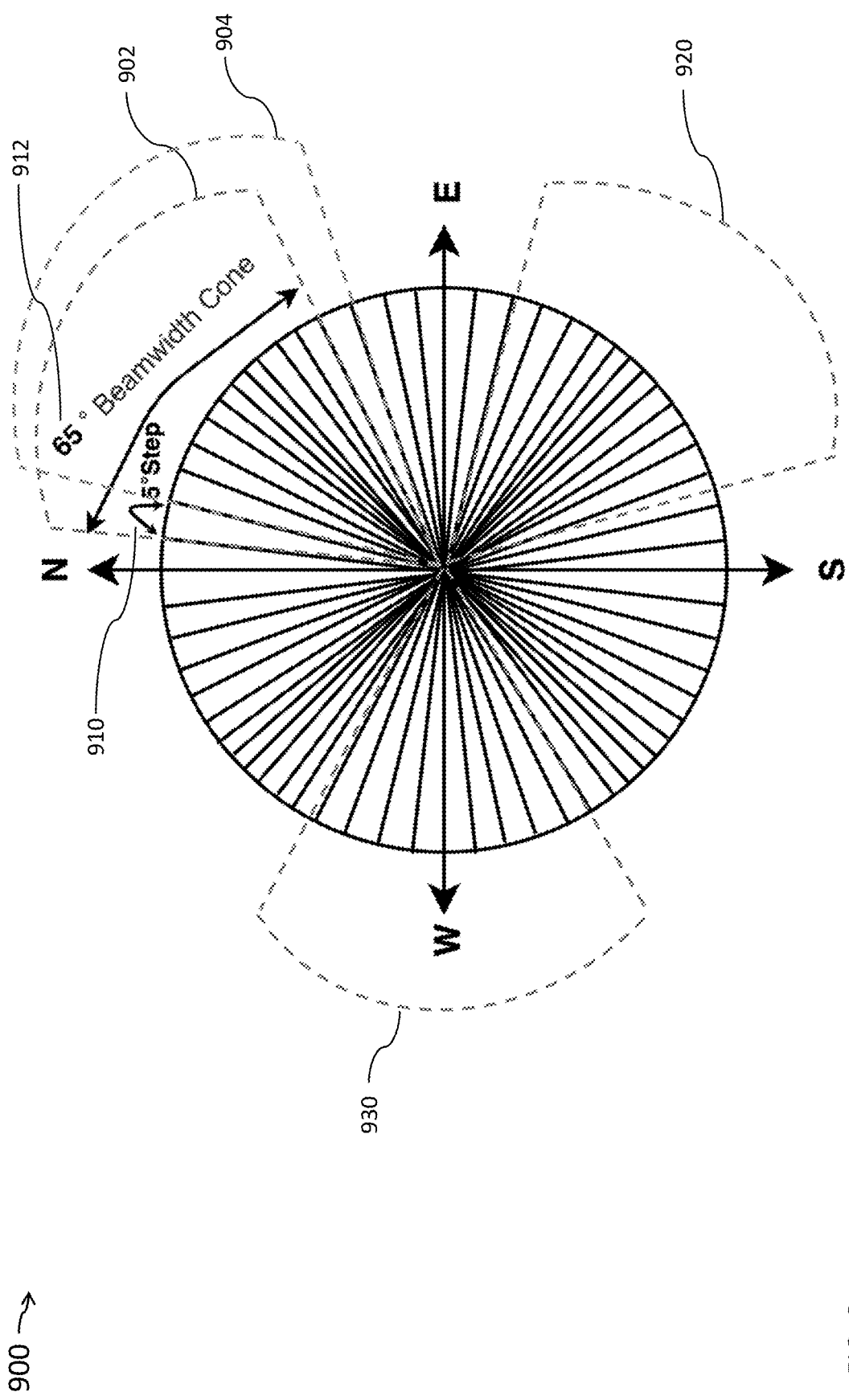
FIG. 9 is a diagram of a map, in accordance with some embodiments.

FIG. 9 is a diagram of a map 900, in accordance with some embodiments.

In some embodiments, map 900 is an embodiment of maps 400A-400B, and similar detailed description is therefore omitted. In some embodiments, map 900 is generated by operation 206 of method 200.

Map 900 includes cones 902, 904, 920 and 930. In some embodiments, each of cones 902, 920 and 930 is a corresponding sector of a cell of the second set of cells 654b. In some embodiments, cones 902 and 904 are the same sector of a cell of the second set of cells 654b.

In some embodiments, each of cones 902, 920 and 930 correspond to the first cone prior to being rotated by the first increment in operation 706 of method 700, and similar detailed description is therefore omitted.

In some embodiments, cone 904 corresponds to the first cone after being rotated by the first increment in operation 706 of method 700, and similar detailed description is therefore omitted. For example, cone 904 is cone 902 after being rotated by the first increment, in accordance with some embodiments. In some embodiments, the first increment 910 in FIG. 9 is equal to 5 degrees. Other values for the first increment 910 are within the scope of the present disclosure.

In some embodiments, each of cones 902, 904, 920 and 930 have a corresponding antenna beam width 912 equal to 65 degrees. In some embodiments, the antenna beam width 912 corresponds to the first antenna beam width of method 700.

Other values for the first antenna beam width are within the scope of the present disclosure.

Other numbers of cones, values of beam widths or first increment values in map 900 are within the scope of the present disclosure.

Figure 10:
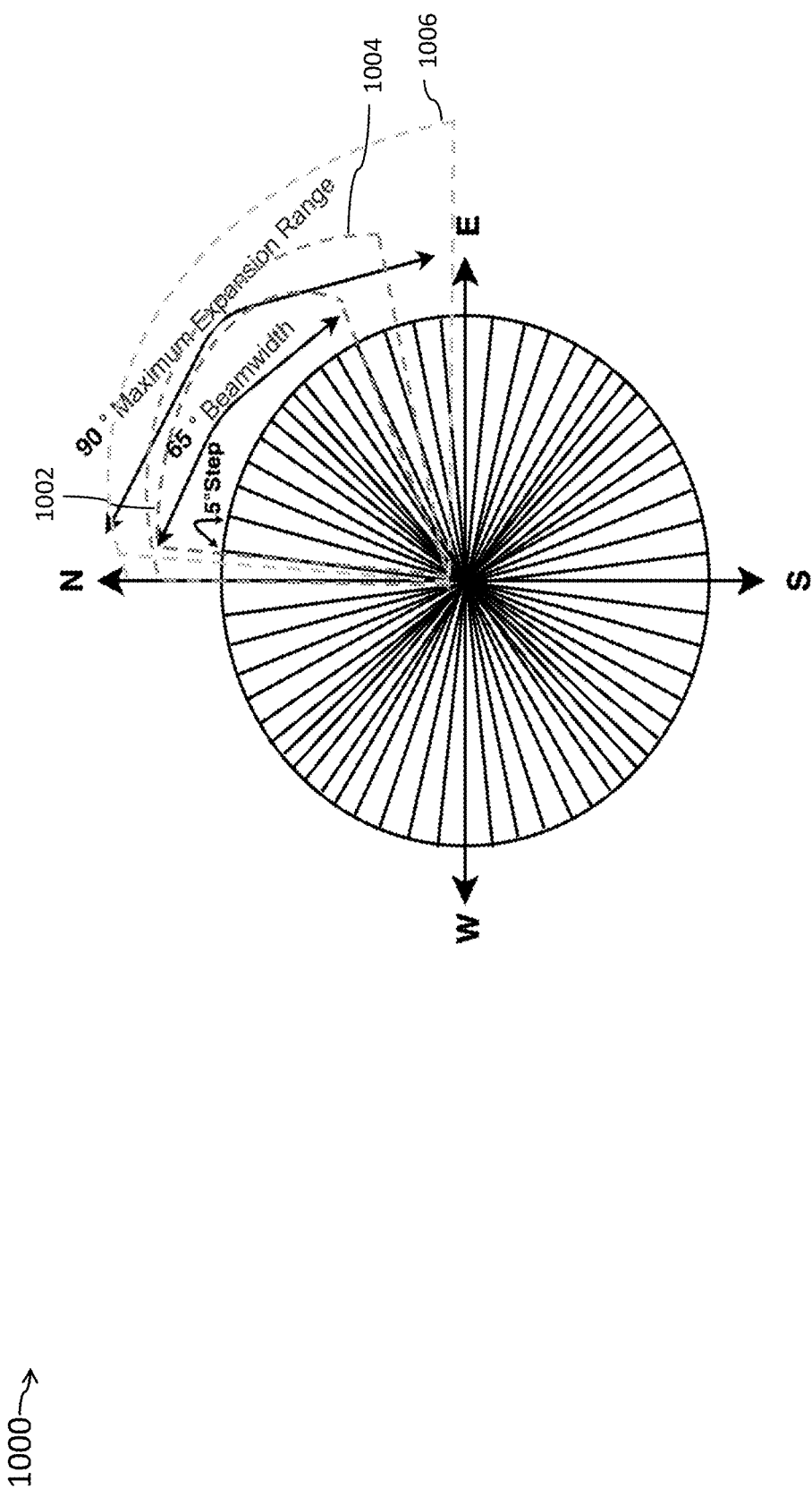
FIG. 10 is a diagram of a map, in accordance with some embodiments.

FIG. 10 is a diagram of a map 1000, in accordance with some embodiments.

In some embodiments, map 1000 is an embodiment of maps 400A-400B, and similar detailed description is therefore omitted. In some embodiments, map 1000 is generated by operation 206 of method 200. Map 1000 is shown with 5 degree steps for clarity. Other step values are within the scope of the present disclosure.

Map 1000 includes cones 1002, 1004 and 1006. In some embodiments, each of cones 1002, 1004 and 1006 is the same sector of a cell of the second set of cells 654b.

In some embodiments, cone 1002 corresponds to the first cone prior to the first antenna beam width is incremented by the second increment in operation 710 of method 700, and similar detailed description is therefore omitted. In some embodiments, cone 1002 has a first antenna beam width equal to 65 degrees.

In some embodiments, cone 1004 corresponds to the first cone after the first antenna beam width is incremented by the second increment in operation 710 of method 700, and similar detailed description is therefore omitted. For example, cone 1004 is cone 1002 after operation 710 where the first antenna beam width is incremented by the second increment. In some embodiments, the second increment in FIG. 10 is equal to 12.5 degrees. Other values for the second increment are within the scope of the present disclosure. In some embodiments, cone 1004 has a first antenna beam width equal to 77.5 degrees.

In some embodiments, cone 1006 corresponds to the first cone after the first antenna beam width is incremented by the second increment in operation 710 of method 700, and similar detailed description is therefore omitted. For example, cone 1006 is cone 1004 after operation 710 where the first antenna beam width is incremented by the second increment. In some embodiments, cone 1006 has a first antenna beam width equal to 90 degrees. In some embodiments, the first antenna beam width of cone 1006 being equal to 90 degrees also corresponds to the second maximum value of method 700.

In some embodiments, the antenna beam width of FIG. 9 corresponds to the first antenna beam width of method 700. Other values for the first antenna beam width are within the scope of the present disclosure.

Other numbers of cones, values of beam widths or second increment values in map 1000 are within the scope of the present disclosure.

FIGS. 11A-11B are corresponding diagrams of corresponding maps 1100A-1100B, in accordance with some embodiments.

In some embodiments, maps 1100A-1100B are an embodiment of maps 400A-400B, and similar detailed description is therefore omitted. In some embodiments, maps 1100A-1100B are generated by operation 206 of method 200.

Map 1100A includes a cone 1104a. In some embodiments, cone 1104a corresponds to the first cone of method 700, and similar detailed description is therefore omitted. In some embodiments, cone 1104a corresponds to the first cone after operation 702 of method 700, and similar detailed description is therefore omitted.

Cone 1104a includes a bisector angle 1110a. In some embodiments, bisector angle 1110a is an embodiment of the bisector angle BA2 of method 700, and similar detailed description is therefore omitted.

Map 1100A further includes a set of geolocation data 1120. In some embodiments, the set of geolocation data 1120 corresponds to the filtered qualified geolocation data of each user data in the second set of user data 654a. In some embodiments, each geolocation data of the set of geolocation data 1120 includes a corresponding bearing angle of a set of bearing angles.

Other numbers of cones, values of deployed azimuths or bearing angles in map 1100A are within the scope of the present disclosure.

Map 1100B includes cones 1102b and 1104b.

In some embodiments, cone 1104b is a variation of cone 1104a of map 1100A, and similar detailed description is therefore omitted.

In some embodiments, cone 1104b corresponds to the second cone of method 700, and similar detailed description is therefore omitted. In some embodiments, cone 1104b corresponds to the second cone after at least one of operation 708 or 709 of method 700, and similar detailed description is therefore omitted.

In some embodiments, cone 1104b has the deployed azimuth AZD, and similar detailed description is therefore omitted. In some embodiments, In some embodiments, cone 1102b corresponds to a cone having the planned azimuth AZP, and similar detailed description is therefore omitted.

Map 1100B shows the azimuth difference AD between the deployed azimuth AZD of cone 1104b and the planned azimuth AZP of cone 1102b.

Cone 1104b includes a bisector angle 1110b. In some embodiments, bisector angle 1110b is an embodiment of the bisector angle BA2 of method 700, and similar detailed description is therefore omitted.

Cone 1102b includes a bisector angle 1110c. In some embodiments, bisector angle 1110c is an embodiment of the bisector angle BA2 of method 700, and similar detailed description is therefore omitted.

Map 1100B further includes a set of geolocation data 1130. In some embodiments, the set of geolocation data 1130 corresponds to the filtered qualified geolocation data of each user data in the second set of user data 654a. In some embodiments, each geolocation data of the set of geolocation data 1130 includes a corresponding bearing angle of a set of bearing angles.

Other numbers of cones, values of deployed azimuths or bearing angles in map 1100B are within the scope of the present disclosure.

FIG. 12 is a schematic view of a system 1200, in accordance with some embodiments.

In some embodiments, system 1200 is an embodiment of one or more elements in system 100, and similar detailed description is therefore omitted. For example, in some embodiments, system 1200 is an embodiment of one or more of set of nodes 102, set of devices 106, set of devices 108, set of devices 116, set of servers 126, and similar detailed description is therefore omitted.

In some embodiments, system 1200 is configured to perform one or more operations of method 200, method 600 or method 700.

System 1200 includes a hardware processor 1202 and a non-transitory, computer readable storage medium 1204 (e.g., memory 1204) encoded with, i.e., storing, the computer program code 1206, i.e., a set of executable instructions 1206. Computer readable storage medium 1204 is configured for interfacing with at least one of set of nodes 102, set of devices 106, set of devices 108, set of devices 116, set of servers 126, network 114 or network 118, and similar detailed description is therefore omitted.

The processor 1202 is electrically coupled to the computer readable storage medium 1204 by a bus 1208. The processor 1202 is also electrically coupled to an I/O interface 1210 by bus 1208. A network interface 1212 is also electrically connected to the processor 1202 by bus 1208. Network interface 1212 is connected to at least one of network 1214, so that processor 1202 and computer readable storage medium 1204 are capable of connecting to external elements by network 1214. The processor 1202 is configured to execute the computer program code 1206 encoded in the computer readable storage medium 1204 in order to cause system 1200 to be usable for performing a portion or all of the operations as described in at least method 200, method 600 or method 700. In some embodiments, network 1214 is not part of system 1200. In some embodiments, network 1214 is an embodiment of at least network 114 or 118 of FIG. 1.

In some embodiments, the processor 1202 is a central processing unit (CPU), a multi-processor, a distributed processing read circuit, an application specific integrated circuit (ASIC), and/or a suitable processing unit.

In some embodiments, the computer readable storage medium 1204 is an electronic, magnetic, optical, electromagnetic, infrared, and/or a semiconductor read circuit (or apparatus or device). For example, the computer readable storage medium 1204 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1204 includes a compact disk-read only memory (CD-ROM), a compact disk-read/write (CD-R/W), and/or a digital video disc (DVD).

In some embodiments, forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read.

The term computer-readable storage medium is used herein to refer to a computer-readable medium.

In some embodiments, the storage medium 1204 stores the computer program code 1206 configured to cause system 1200 to perform one or more operations of at least method 200, method 600 or method 700. In some embodiments, the storage medium 1204 also stores information used for performing at least method 200, method 600 or method 700 as well as information generated during performing at least method 200, method 600 or method 700, such as disoriented cell report 1216, Map 1218, planned azimuth 1220, deployed azimuth 1222, user interface 1224, user parameters 1226, and/or a set of executable instructions to perform one or more operations of at least method 200, method 600 or method 700.

In some embodiments, the storage medium 1204 stores instructions (e.g., computer program code 1206) for interfacing with at least one or more of set of nodes 102, set of devices 106, set of devices 108, set of devices 116, set of servers 126. The instructions (e.g., computer program code 1206) enable processor 1202 to generate instructions readable by at least one or more of set of nodes 102, set of devices 106, set of devices 108, set of devices 116, set of servers 126 to effectively implement one or more operations of at least method 200, method 600 or method 700 during operation of system 201.

System 1200 includes I/O interface 1210. I/O interface 1210 is coupled to external circuitry. In some embodiments, I/O interface 1210 includes a keyboard, keypad, mouse, trackball, trackpad, and/or cursor direction keys for communicating information and commands to processor 1202.

System 1200 also includes network interface 1212 coupled to the processor 1202. Network interface 1212 allows system 1200 to communicate with network 1214, to which one or more other computer read circuits are connected. Network interface 1212 includes wireless network interfaces such as OFDMA, CDMA, BLUETOOTH, WIFI, WIMAX, GPRS, or WCDMA; or wired network interface such as ETHERNET, USB, or IEEE-802.11. In some embodiments, at least method 200, method 600 or method 700 is implemented in two or more systems 1200, and information such as disoriented cell report, Map, planned azimuth, deployed azimuth and user interface are exchanged between different systems 1200 by network 1214.

System 1200 is configured to receive information related to a disoriented cell report through I/O interface 1210 or network interface 1212. The information is transferred to processor 1202 by bus 1208, and is then stored in computer readable medium 1204 as disoriented cell report 1216. In some embodiments, disoriented cell report 1216 corresponds to disoriented cell report 300, and similar detailed description is therefore omitted. System 1200 is configured to receive information related to Map through I/O interface 1210 or network interface 1212. The information is stored in computer readable medium 1204 as Map 1218. In some embodiments, Map 1218 corresponds to map 400A and map 400B, and similar detailed description is therefore omitted. System 1200 is configured to receive information related to a planned azimuth through I/O interface 1210 or network interface 1212. The information is stored in computer readable medium 1204 as planned azimuth 1220. In some embodiments, planned azimuth 1220 corresponds to at least one of column 4 of disoriented cell report 300 or planned azimuth AZP, and similar detailed description is therefore omitted. System 1200 is configured to receive information related to a deployed azimuth through I/O interface 1210 or network interface 1212. The information is stored in computer readable medium 1204 as deployed azimuth 1222. In some embodiments, deployed azimuth 1222 corresponds to at least one of column 5 of disoriented cell report 300 or deployed azimuth AZD, and similar detailed description is therefore omitted. System 1200 is configured to receive information related to a user interface through I/O interface 1210 or network interface 1212. The information is stored in computer readable medium 1204 as user interface 1224. System 1200 is configured to receive information related to user parameters through I/O interface 1210 or network interface 1212. The information is stored in computer readable medium 1204 as user parameters 1226. In some embodiments, user parameters 1226 corresponds to at least one or more columns of disoriented cell report 300, parameter portion 444, user data of the set of user data of methods 200 and 600-700, the first threshold of methods 600-700, the second threshold of methods 600-700, the third threshold of method 700, the first maximum value of method 700, the azimuth difference of methods 600-700, the antenna beam width of methods 600-700, the bearing angles of methods 600-700, the bisector angle of methods 600-700, and similar detailed description is therefore omitted.

In some embodiments, at least method 300, method 600 or method 700 is implemented as a standalone software application for execution by a processor. In some embodiments, at least method 300, method 600 or method 700 is implemented as corresponding software applications for execution by one or more processors.

In some embodiments, at least method 300, method 600 or method 700 is implemented as a software application that is a part of an additional software application. In some embodiments, at least method 300, method 600 or method 700 is implemented as a plug-in to a software application.

In some embodiments, at least method 300, method 600 or method 700 is implemented as a software application that is a portion of an RF planning tool. In some embodiments, at least method 300, method 600 or method 700 is implemented as a software application that is used by an RF planning tool. In some embodiments, the RF planning tool is used to plan, deploy, monitor and optimize one or more cellular networks.

In some embodiments, one or more of the operations of method 300, method 600 or method 700 is not performed.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

One aspect of this description relates to a method for disoriented cell configuration. In some embodiments, the method includes collecting, by a first server, user data of a first set of cells over a first duration of time, wherein the user data includes at least one of received signal strength of a first set of users, geolocation data of the first set of users, or a cell identifier of a corresponding cell of the first set of cells configured to serve the first set of users. In some embodiments, the method further includes determining, by the first server, a disoriented cell of the first set of cells based on the user data, wherein the disoriented cell of the first set of cells includes a node with an antenna with a deployed azimuth different from a planned azimuth, and the disoriented cell of the first set of cells corresponds to a filtered first set of qualified geolocation data of a filtered second set of users. In some embodiments, the method further includes changing a configuration of the antenna of the disoriented cell, wherein changing the configuration of the antenna of the disoriented cell includes changing the deployed azimuth of the antenna to be equal to the planned azimuth of the antenna.

Another aspect of this description relates to an apparatus for disoriented cell configuration. In some embodiments, the system includes a memory having non-transitory instructions stored, and a processor coupled to the memory, and being configured to execute the instructions, thereby causing the apparatus to collect user data of a first set of cells over a first duration of time, wherein the user data includes at least one of received signal strength of a first set of users, geolocation data of the first set of users, or a cell identifier of a corresponding cell of the first set of cells configured to serve the first set of users; determine a disoriented cell of the first set of cells based on the user data, wherein the disoriented cell of the first set of cells includes a node with an antenna with a deployed azimuth different from a planned azimuth, and the disoriented cell of the first set of cells corresponds to a filtered first set of qualified geolocation data of a filtered second set of users; and change a configuration of the antenna of the disoriented cell, wherein the non-transitory instructions that cause the apparatus to change the configuration of the antenna of the disoriented cell, the processor being further configured to cause the apparatus to: change the deployed azimuth of the antenna to be equal to the planned azimuth of the antenna.

Still another aspect of this description relates to a computer-readable medium. In some embodiments, the computer-readable medium includes instructions executable by a controller of a first server to cause the controller to perform operations including collecting user data of a first set of cells over a first duration of time, wherein the user data includes at least one of received signal strength of a first set of users, geolocation data of the first set of users, or a cell identifier of a corresponding cell of the first set of cells configured to serve the first set of users. In some embodiments, the computer-readable medium includes instructions to cause the controller to perform operations further including determining a disoriented cell of the first set of cells based on the user data, wherein the disoriented cell of the first set of cells includes a node with an antenna with a deployed azimuth different from a planned azimuth, and the disoriented cell of the first set of cells corresponds to a filtered first set of qualified geolocation data of a filtered second set of users. In some embodiments, the computer-readable medium includes instructions to cause the controller to perform operations further including changing a configuration of the antenna of the disoriented cell. In some embodiments, changing the configuration of the antenna of the disoriented cell includes changing the deployed azimuth of the antenna to be equal to the planned azimuth of the antenna.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for disoriented cell configuration, the method comprising:
    collecting, by a first server, user data of a first set of cells over a first duration of time, wherein the user data includes at least one of received signal strength of a first set of users, geolocation data of the first set of users, or a cell identifier of a corresponding cell of the first set of cells configured to serve the first set of users;
    determining, by the first server, a disoriented cell of the first set of cells based on the user data, wherein the disoriented cell of the first set of cells includes a node with an antenna with a deployed azimuth different from a planned azimuth, and the disoriented cell of the first set of cells corresponds to a filtered first set of qualified geolocation data of a filtered second set of users; and
    changing a configuration of the antenna of the disoriented cell, wherein changing the configuration of the antenna of the disoriented cell comprises:
        changing the deployed azimuth of the antenna to be equal to the planned azimuth of the antenna.

2. The method of claim 1, further comprising:
    generating, by the first server, a disoriented cell report, the disoriented cell report including at least one of the disoriented cell, the cell identifier of the disoriented cell, a site name of the disoriented cell, a location of the disoriented cell, a frequency band of the disoriented cell, an azimuth deviation of the disoriented cell, the deployed azimuth or the planned azimuth.

3. The method of claim 2, further comprising:
    generating, by the first server, a map based on the disoriented cell report, wherein the map displays graphical details of the disoriented cell report.

4. The method of claim 1, wherein determining the disoriented cell of the first set of cells based on the user data comprises:
    for each cell identifier of the first set of cells, filtering the user data that fails to include at least corresponding geolocation data thereby generating a first set of user data of a second set of users for each cell identifier in the first set of cells, each user in the second set of users having corresponding user data of the first set of user data, and each user data in the first set of user data having a corresponding qualified geolocation data of a first set of qualified geolocation data; and
    for each cell identifier of the first set of cells, filtering cells in the first set of cells that have a first quantity of samples of corresponding geolocation data in the first set of qualified geolocation data being less than a first threshold, thereby generating a second set of cells,
    wherein each cell in the second set of cells has a second set of user data of the filtered second set of users, each user in the filtered second set of users having corresponding user data of the second set of user data, and each user data in the second set of user data having a corresponding filtered qualified geolocation data of the filtered first set of qualified geolocation data.

5. The method of claim 4, wherein determining the disoriented cell of the first set of cells based on the user data further comprises:
    determining the deployed azimuth for each cell in the second set of cells;
    for each cell in the second set of cells, generating an azimuth difference by determining a difference between the planned azimuth and the deployed azimuth; and one of at least:
designating the cell as the disoriented cell in response to determining that the azimuth difference is greater than a second threshold; or
designating the cell as a non-disoriented cell in response to determining that the azimuth difference is less than or equal to the second threshold.

6. The method of claim 5, wherein determining the deployed azimuth for each cell in the second set of cells comprises:
for each user data in the second set of user data for each cell in the second set of cells, determining a corresponding bearing angle based on the corresponding filtered qualified geolocation data of the filtered first set of qualified geolocation data, wherein the corresponding bearing angle is with respect to the corresponding cell of the second set of cells;
for each cell in the second set of cells, generating a first cone on a first map, the first cone having a first antenna beam width, and the first map including the filtered qualified geolocation data of each user data in the second set of user data, wherein a first vertex of the first cone corresponds to a location of the corresponding cell of the second set of cells on the first map; and
for each cell in the second set of cells, performing the following operations:
(1) determining a first quantity of samples in the second set of user data within the first cone, or determining a first percentage of samples in the second set of user data within the first cone;
(2) designating each cell of the second set of cells as the disoriented cell in response to determining that the first quantity of samples or the first percentage of samples is greater than a third threshold;
(3) rotating the first cone by a first increment, and repeating operations 1 and 2; and
(4) repeating operation 3 until a first maximum value is reached;
for each cell in the second set of cells, determining that the first cone with a maximum of the first quantity of samples or a maximum of the first percentage of samples corresponds to a second cone of a disoriented cell; and
for each cell in the second set of cells, determining the deployed azimuth based on either each of the bearing angles included in the second cone or a bi-sector angle of a centroid of the second cone of the disoriented cell.

7. The method of claim 6, wherein determining the deployed azimuth for each cell in the second set of cells further comprises:
in response to determining that the first quantity of samples or the first percentage of samples is less than or equal to the third threshold, performing the following operations:
(5) increasing the first antenna beam width of the first cone by a second increment, and repeating operations 1-4 to identify the disoriented cell;
(6) repeating operation 5 until a second maximum value is reached; and
(7) determining that the first cone with the second maximum value includes the maximum of samples of the first quantity of samples or the maximum of the first percentage of samples corresponds to the second cone of the disoriented cell in response to determining that no cell in the second set of cells has the first quantity of samples or the first percentage of samples being greater than the third threshold.

8. An apparatus for disoriented cell configuration, comprising:
a memory having non-transitory instructions stored therein; and
a processor coupled to the memory, and being configured to execute the non-transitory instructions, thereby causing the apparatus to:
collect user data of a first set of cells over a first duration of time, wherein the user data includes at least one of received signal strength of a first set of users, geolocation data of the first set of users, or a cell identifier of a corresponding cell of the first set of cells configured to serve the first set of users;
determine a disoriented cell of the first set of cells based on the user data, wherein the disoriented cell of the first set of cells includes a node with an antenna with a deployed azimuth different from a planned azimuth, and the disoriented cell of the first set of cells corresponds to a filtered first set of qualified geolocation data of a filtered second set of users; and
change a configuration of the antenna of the disoriented cell, wherein the non-transitory instructions that cause the apparatus to change the configuration of the antenna of the disoriented cell, the processor being further configured to cause the apparatus to:
change the deployed azimuth of the antenna to be equal to the planned azimuth of the antenna.

9. The apparatus of claim 8, wherein the processor is further configured to execute the non-transitory instructions, thereby further causing the apparatus to:
generate a disoriented cell report, the disoriented cell report including at least one of the disoriented cell, the cell identifier of the disoriented cell, a site name of the disoriented cell, a location of the disoriented cell, a frequency band of the disoriented cell, an azimuth deviation of the disoriented cell, the deployed azimuth or the planned azimuth.

10. The apparatus of claim 9, wherein the processor is further configured to execute the non-transitory instructions, thereby further causing the apparatus to:
generate a map based on the disoriented cell report, wherein the map displays graphical details of the disoriented cell report.

11. The apparatus of claim 8, wherein the non-transitory instructions that cause the apparatus to determine the disoriented cell of the first set of cells based on the user data, the processor being further configured to cause the apparatus to:
for each cell identifier of the first set of cells, filter the user data that fails to include at least corresponding geolocation data to thereby generate a first set of user data of a second set of users for each cell identifier in the first set of cells, each user in the second set of users having corresponding user data of the first set of user data, and each user data in the first set of user data having a corresponding qualified geolocation data of a first set of qualified geolocation data; and
for each cell identifier of the first set of cells, filter cells in the first set of cells that have a first quantity of samples of corresponding geolocation data in the first set of qualified geolocation data being less than a first threshold, to thereby generate a second set of cells,
wherein each cell in the second set of cells has a second set of user data of the filtered second set of users, each user in the filtered second set of users having corresponding user data of the second set of user data, and each user data in the second set of user data having a corresponding filtered qualified geolocation data of the filtered first set of qualified geolocation data.

12. The apparatus of claim 11, wherein the non-transitory instructions that cause the apparatus to determine the disoriented cell of the first set of cells based on the user data, the processor being further configured to cause the apparatus to:
determine the deployed azimuth for each cell in the second set of cells;
for each cell in the second set of cells, generate an azimuth difference by a determination of a difference between the planned azimuth and the deployed azimuth; and
one of at least:
designate the cell as the disoriented cell in response to a determination that the azimuth difference is greater than a second threshold; or
designate the cell as a non-disoriented cell in response to a determination that the azimuth difference is less than or equal to the second threshold.

13. The apparatus of claim 12, wherein the non-transitory instructions that cause the apparatus to determine the deployed azimuth for each cell in the second set of cells, the processor being further configured to cause the apparatus to:
for each user data in the second set of user data for each cell in the second set of cells, determine a corresponding bearing angle based on the corresponding filtered qualified geolocation data of the filtered first set of qualified geolocation data, wherein the corresponding bearing angle is with respect to the corresponding cell of the second set of cells;
for each cell in the second set of cells, generate a first cone on a first map, the first cone having a first antenna beam width, and the first map including the filtered qualified geolocation data of each user data in the second set of user data, wherein a first vertex of the first cone corresponds to a location of the corresponding cell of the second set of cells on the first map; and
for each cell in the second set of cells, perform the following operations:
(1) determine a first quantity of samples in the second set of user data within the first cone, or determine a first percentage of samples in the second set of user data within the first cone;
(2) designate each cell of the second set of cells as the disoriented cell in response to a determination that the first quantity of samples or the first percentage of samples is greater than a third threshold;
(3) rotate the first cone by a first increment, and repeat operations 1 and 2; and
(4) repeat operation 3 until a first maximum value is reached;
for each cell in the second set of cells, determine that the first cone with a maximum of the first quantity of samples or a maximum of the first percentage of samples corresponds to a second cone of a disoriented cell; and
for each cell in the second set of cells, determine the deployed azimuth based on either each of the bearing angles included in the second cone or a bi-sector angle of a centroid of the second cone of the disoriented cell.

14. The apparatus of claim 13, wherein the non-transitory instructions that cause the apparatus to determine the deployed azimuth for each cell in the second set of cells, the processor being further configured to cause the apparatus to:
in response to a determination that the first quantity of samples or the first percentage of samples is less than or equal to the third threshold, perform the following operations:
(5) increase the first antenna beam width of the first cone by a second increment, and repeat operations 1-4 to identify the disoriented cell;
(6) repeat operation 5 until a second maximum value is reached; and
(7) determine that the first cone with the second maximum value includes the maximum of samples of the first quantity of samples or the maximum of the first percentage of samples corresponds to the second cone of the disoriented cell in response to a determination that no cell in the second set of cells has the first quantity of samples or the first percentage of samples being greater than the third threshold.

15. A non-transitory computer-readable medium including instructions executable by a controller of a first server to cause the controller to perform operations comprising:
collecting user data of a first set of cells over a first duration of time, wherein the user data includes at least one of received signal strength of a first set of users, geolocation data of the first set of users, or a cell identifier of a corresponding cell of the first set of cells configured to serve the first set of users;
determining a disoriented cell of the first set of cells based on the user data, wherein the disoriented cell of the first set of cells includes a node with an antenna with a deployed azimuth different from a planned azimuth, and the disoriented cell of the first set of cells corresponds to a filtered first set of qualified geolocation data of a filtered second set of users; and
changing a configuration of the antenna of the disoriented cell, wherein changing the configuration of the antenna of the disoriented cell comprises:
changing the deployed azimuth of the antenna to be equal to the planned azimuth of the antenna.

16. The non-transitory computer-readable medium of claim 15, wherein the instructions executable by the controller of the first server cause the controller to perform further operations comprising:
generating a disoriented cell report, the disoriented cell report including at least one of the disoriented cell, the cell identifier of the disoriented cell, a site name of the disoriented cell, a location of the disoriented cell, a frequency band of the disoriented cell, an azimuth deviation of the disoriented cell, the deployed azimuth or the planned azimuth; and
generating a map based on the disoriented cell report, wherein the map displays graphical details of the disoriented cell report.

17. The non-transitory computer-readable medium of claim 15, wherein the instructions that cause the controller to perform operations comprising determining the disoriented cell of the first set of cells based on the user data, the controller being further configured to perform operations comprising:
for each cell identifier of the first set of cells, filtering the user data that fails to include at least corresponding geolocation data thereby generating a first set of user data of a second set of users for each cell identifier in the first set of cells, each user in the second set of users having corresponding user data of the first set of user data, and each user data in the first set of user data having a corresponding qualified geolocation data of a first set of qualified geolocation data; and for each cell identifier of the first set of cells, filtering cells in the first set of cells that have a first quantity of samples of corresponding geolocation data in the first set of qualified geolocation data being less than a first threshold, thereby generating a second set of cells, wherein each cell in the second set of cells has a second set of user data of the filtered second set of users, each user in the filtered second set of users having corresponding user data of the second set of user data, and each user data in the second set of user data having a corresponding filtered qualified geolocation data of the filtered first set of qualified geolocation data.

18. The non-transitory computer-readable medium of claim 17, wherein the instructions that cause the controller to perform operations comprising determining the disoriented cell of the first set of cells based on the user data, the controller being further configured to perform operations further comprising:

determining the deployed azimuth for each cell in the second set of cells;

for each cell in the second set of cells, generating an azimuth difference by determining a difference between the planned azimuth and the deployed azimuth; and one of at least:
  designating the cell as the disoriented cell in response to determining that the azimuth difference is greater than a second threshold; or
  designating the cell as a non-disoriented cell in response to determining that the azimuth difference is less than or equal to the second threshold.

19. The non-transitory computer-readable medium of claim 18, wherein the instructions that cause the controller to perform operations comprising determining the deployed azimuth for each cell in the second set of cells, the controller being further configured to perform operations comprising:

for each user data in the second set of user data for each cell in the second set of cells, determining a corresponding bearing angle based on the corresponding filtered qualified geolocation data of the filtered first set of qualified geolocation data, wherein the corresponding bearing angle is with respect to the corresponding cell of the second set of cells;

for each cell in the second set of cells, generating a first cone on a first map, the first cone having a first antenna beam width, and the first map including the filtered qualified geolocation data of each user data in the second set of user data, wherein a first vertex of the first cone corresponds to a location of the corresponding cell of the second set of cells on the first map; and for each cell in the second set of cells, performing the following operations:
  (1) determining a first quantity of samples in the second set of user data within the first cone, or determining a first percentage of samples in the second set of user data within the first cone;
  (2) designating each cell of the second set of cells as the disoriented cell in response to determining that the first quantity of samples or the first percentage of samples is greater than a third threshold;
  (3) rotating the first cone by a first increment, and repeating operations 1 and 2; and
  (4) repeating operation 3 until a first maximum value is reached;

for each cell in the second set of cells, determining that the first cone with a maximum of the first quantity of samples or a maximum of the first percentage of samples corresponds to a second cone of a disoriented cell; and for each cell in the second set of cells, determining the deployed azimuth based on either each of the bearing angles included in the second cone or a bi-sector angle of a centroid of the second cone of the disoriented cell.

20. The non-transitory computer-readable medium of claim 19, wherein the instructions that cause the controller to perform operations comprising determining the deployed azimuth for each cell in the second set of cells, the controller being further configured to perform operations further comprising:

in response to determining that the first quantity of samples or the first percentage of samples is less than or equal to the third threshold, performing the following operations:
  (5) increasing the first antenna beam width of the first cone by a second increment, and repeating operations 1-4 to identify the disoriented cell;
  (6) repeating operation 5 until a second maximum value is reached; and
  (7) determining that the first cone with the second maximum value includes the maximum of samples of the first quantity of samples or the maximum of the first percentage of samples corresponds to the second cone of the disoriented cell in response to determining that no cell in the second set of cells has the first quantity of samples or the first percentage of samples being greater than the third threshold.

* * * * *